(12) United States Patent
Tapson et al.

(10) Patent No.: US 7,609,849 B2
(45) Date of Patent: Oct. 27, 2009

(54) DATA PROCESSING APPARATUS AND METHOD

(75) Inventors: Daniel Warren Tapson, London (GB); Daniel Luke Hooper, Battersea (GB)

(73) Assignee: Sony United Kingdom Limited, Weybridge (GB)

( * ) Notice: Subject to any disclaimer, the term of this patent is extended or adjusted under 35 U.S.C. 154(b) by 680 days.

(21) Appl. No.: 11/296,771

(22) Filed: Dec. 7, 2005

(65) Prior Publication Data

US 2006/0153422 A1  Jul. 13, 2006

(30) Foreign Application Priority Data

Dec. 9, 2004  (GB) ................. 0427033.6

(51) Int. Cl.
*G06K 9/00* (2006.01)

(52) U.S. Cl. ...................... 382/100; 713/176

(58) Field of Classification Search ............... 382/100, 382/232; 380/54, 210, 252, 287; 713/176; 704/200.1, 273; 381/73.1; 348/460, 463
See application file for complete search history.

(56) References Cited

U.S. PATENT DOCUMENTS

| | | | | |
|---|---|---|---|---|
| 5,859,920 | A * | 1/1999 | Daly et al. | 382/115 |
| 5,946,414 | A * | 8/1999 | Cass et al. | 382/183 |
| 6,665,419 | B1 * | 12/2003 | Oami | 382/100 |
| 6,778,678 | B1 * | 8/2004 | Podilchuk et al. | 382/100 |
| 2004/0071312 | A1 * | 4/2004 | Ogawa et al. | 382/100 |
| 2007/0129952 | A1 * | 6/2007 | Kenyon et al. | 704/500 |

OTHER PUBLICATIONS

Qiang Cheng, et al., "Optimum Detection and Decoding of Multiplicative Watermarks in DFT Domain", Proceedings from the IEEE International Conference on Acoustics, Speech, and Signal Processing, XP-010804820, vol. 4 of 4, May 13, 2002, pp. IV-3477-IV-3480.
Chun-Shien Lu, et al., "Multipurpose Watermarking for Image Authentication and Protection", IEEE Transactions on Image Processing, XP-011025849, vol. 10, No. 10, Oct. 2001, pp. 1579-1592.
Guo-Shiang Lin, et al., "Data Hiding Domain Classification for Blind Image Steganalysis", IEEE International Conference on Multimedia and Expo (ICME), XP-010770967, vol. 2, Jun. 27, 2004, pp. 907-910.

* cited by examiner

*Primary Examiner*—Anand Bhatnagar
(74) *Attorney, Agent, or Firm*—Oblon, Spivak, McClelland, Maier & Neustadt, L.L.P.

(57) ABSTRACT

A method includes generating, for a signal sample, first and second gaussian likelihood functions describing a likelihood of a watermark codeword coefficient value embedded into the signal sample being, respectively, positive and negative. The first gaussian likelihood function has a mean defined by a sum of a local mean value and a watermark strength value and a standard deviation defined by a local standard deviation. The second gaussian likelihood function has a mean defined by a difference between the local mean value and the watermark strength value and the standard deviation defined by the local standard deviation. The method also includes detecting a watermark in an image signal based on a probability of watermark codeword coefficients added to the signal sample being one of positive or negative, the probability being calculated from the first gaussian likelihood function and the second gaussian likelihood function.

9 Claims, 26 Drawing Sheets

SPATIAL POSTERIORI PROBABILITIES

Fig. 27

| | A | B | C | E | G | H | I |
|---|---|---|---|---|---|---|---|
| 1 | FILTER | SOURCE | WMK | RECEIVED | LOCAL_MEAN | RESIDUAL | RESIDUAL^2 |
| 2 | 0.15 | 120 | 0.7655 | =B2+C2 | | | |
| 3 | 0.22 | 138 | 0.0864 | =B3+C3 | | | |
| 4 | 0.26 | 154 | 0.3759 | =B4+C4 | =A$2*E2+A$3*E3+A$4*E4+A$5*E5+A$6*E6 | =E4-G4 | =H4*H4 |
| 5 | 0.22 | 169 | -1.2319 | =B5+C5 | =A$2*E3+A$3*E4+A$4*E5+A$5*E6+A$6*E7 | =E5-G5 | =H5*H5 |
| 6 | 0.15 | 184 | 0.8882 | =B6+C6 | =A$2*E4+A$3*E5+A$4*E6+A$5*E7+A$6*E8 | =E6-G6 | =H6*H6 |
| 7 | | 193 | -0.3201 | =B7+C7 | =A$2*E5+A$3*E6+A$4*E7+A$5*E8+A$6*E9 | =E7-G7 | =H7*H7 |
| 8 | | 209 | -0.3149 | =B8+C8 | =A$2*E6+A$3*E7+A$4*E8+A$5*E9+A$6*E10 | =E8-G8 | =H8*H8 |
| 9 | | 222 | -0.7853 | =B9+C9 | =A$2*E7+A$3*E8+A$4*E9+A$5*E10+A$6*E11 | =E9-G9 | =H9*H9 |
| 10 | | 241 | 0.133 | =B10+C10 | =A$2*E8+A$3*E9+A$4*E10+A$5*E11+A$6*E12 | =E10-G10 | =H10*H10 |
| 11 | | 247 | 1.2717 | =B11+C11 | =A$2*E9+A$3*E10+A$4*E11+A$5*E12+A$6*E13 | =E11-G11 | =H11*H11 |
| 12 | | 258 | 0.3143 | =B12+C12 | =A$2*E10+A$3*E11+A$4*E12+A$5*E13+A$6*E14 | =E12-G12 | =H12*H12 |
| 13 | | 259 | 0.6044 | =B13+C13 | =A$2*E11+A$3*E12+A$4*E13+A$5*E14+A$6*E15 | =E13-G13 | =H13*H13 |
| 14 | | 256 | -0.908 | =B14+C14 | =A$2*E12+A$3*E13+A$4*E14+A$5*E15+A$6*E16 | =E14-G14 | =H14*H14 |
| 15 | | 266 | -0.9933 | =B15+C15 | =A$2*E13+A$3*E14+A$4*E15+A$5*E16+A$6*E17 | =E15-G15 | =H15*H15 |
| 16 | | 273 | 0.8154 | =B16+C16 | =A$2*E14+A$3*E15+A$4*E16+A$5*E17+A$6*E18 | =E16-G16 | =H16*H16 |
| 17 | | 275 | -1.6812 | =B17+C17 | =A$2*E15+A$3*E16+A$4*E17+A$5*E18+A$6*E19 | =E17-G17 | =H17*H17 |
| 18 | | 268 | 0.6682 | =B18+C18 | =A$2*E16+A$3*E17+A$4*E18+A$5*E19+A$6*E20 | =E18-G18 | =H18*H18 |
| 19 | | 274 | -1.6779 | =B19+C19 | =A$2*E17+A$3*E18+A$4*E19+A$5*E20+A$6*E21 | =E19-G19 | =H19*H19 |
| 20 | | 267 | 0.3291 | =B20+C20 | =A$2*E18+A$3*E19+A$4*E20+A$5*E21+A$6*E22 | =E20-G20 | =H20*H20 |
| 21 | | 255 | -0.8198 | =B21+C21 | =A$2*E19+A$3*E20+A$4*E21+A$5*E22+A$6*E23 | =E21-G21 | =H21*H21 |
| 22 | | 248 | 0.5968 | =B22+C22 | =A$2*E20+A$3*E21+A$4*E22+A$5*E23+A$6*E24 | =E22-G22 | =H22*H22 |
| 23 | | 257 | 0.2753 | =B23+C23 | =A$2*E21+A$3*E22+A$4*E23+A$5*E24+A$6*E25 | =E23-G23 | =H23*H23 |
| 24 | | 259 | 1.1607 | =B24+C24 | =A$2*E22+A$3*E23+A$4*E24+A$5*E25+A$6*E26 | =E24-G24 | =H24*H24 |
| 25 | | 273 | -0.7727 | =B25+C25 | =A$2*E23+A$3*E24+A$4*E25+A$5*E26+A$6*E27 | =E25-G25 | =H25*H25 |
| 26 | | 308 | -1.0018 | =B26+C26 | =A$2*E24+A$3*E25+A$4*E26+A$5*E27+A$6*E28 | =E26-G26 | =H26*H26 |
| 27 | | 313 | 0.0344 | =B27+C27 | =A$2*E25+A$3*E26+A$4*E27+A$5*E28+A$6*E29 | =E27-G27 | =H27*H27 |
| 28 | | 326 | -0.7948 | =B28+C28 | =A$2*E26+A$3*E27+A$4*E28+A$5*E29+A$6*E30 | =E28-G28 | =H28*H28 |
| 29 | | 340 | 1.6694 | =B29+C29 | =A$2*E27+A$3*E28+A$4*E29+A$5*E30+A$6*E31 | =E29-G29 | =H29*H29 |
| 30 | | 359 | 0.5157 | =B30+C30 | =A$2*E28+A$3*E29+A$4*E30+A$5*E31+A$6*E32 | =E30-G30 | =H30*H30 |
| 31 | | 365 | 1.9465 | =B31+C31 | =A$2*E29+A$3*E30+A$4*E31+A$5*E32+A$6*E33 | =E31-G31 | =H31*H31 |
| 32 | | 370 | -0.0053 | =B32+C32 | =A$2*E30+A$3*E31+A$4*E32+A$5*E33+A$6*E34 | =E32-G32 | =H32*H32 |
| 33 | | 379 | 0.3217 | =B33+C33 | =A$2*E31+A$3*E32+A$4*E33+A$5*E34+A$6*E35 | =E33-G33 | =H33*H33 |
| 34 | | 392 | -1.3343 | =B34+C34 | =A$2*E32+A$3*E33+A$4*E34+A$5*E35+A$6*E36 | =E34-G34 | =H34*H34 |
| 35 | | 390 | -0.1887 | =B35+C35 | =A$2*E33+A$3*E34+A$4*E35+A$5*E36+A$6*E37 | =E35-G35 | =H35*H35 |
| 36 | | 395 | 1.2472 | =B36+C36 | =A$2*E34+A$3*E35+A$4*E36+A$5*E37+A$6*E38 | =E36-G36 | =H36*H36 |
| 37 | | 388 | -0.718 | =B37+C37 | =A$2*E35+A$3*E36+A$4*E37+A$5*E38+A$6*E39 | =E37-G37 | =H37*H37 |
| 38 | | 391 | -0.0901 | =B38+C38 | =A$2*E36+A$3*E37+A$4*E38+A$5*E39+A$6*E40 | =E38-G38 | =H38*H38 |
| 39 | | 382 | 0.1581 | =B39+C39 | =A$2*E37+A$3*E38+A$4*E39+A$5*E40+A$6*E41 | =E39-G39 | =H39*H39 |
| 40 | | 367 | 0.3388 | =B40+C40 | =A$2*E38+A$3*E39+A$4*E40+A$5*E41+A$6*E42 | =E40-G40 | =H40*H40 |
| 41 | | 369 | 0.0615 | =B41+C41 | =A$2*E39+A$3*E40+A$4*E41+A$5*E42+A$6*E43 | =E41-G41 | =H41*H41 |
| 42 | | 358 | 0.8081 | =B42+C42 | =A$2*E40+A$3*E41+A$4*E42+A$5*E43+A$6*E44 | =E42-G42 | =H42*H42 |
| 43 | | 350 | -0.3674 | =B43+C43 | =A$2*E41+A$3*E42+A$4*E43+A$5*E44+A$6*E45 | =E43-G43 | =H43*H43 |
| 44 | | 358 | -1.5315 | =B44+C44 | =A$2*E42+A$3*E43+A$4*E44+A$5*E45+A$6*E46 | =E44-G44 | =H44*H44 |
| 45 | | 362 | -1.2357 | =B45+C45 | =A$2*E43+A$3*E44+A$4*E45+A$5*E46+A$6*E47 | =E45-G45 | =H45*H45 |
| 46 | | 363 | 0.6427 | =B46+C46 | =A$2*E44+A$3*E45+A$4*E46+A$5*E47+A$6*E48 | =E46-G46 | =H46*H46 |
| 47 | | 368 | -0.0656 | =B47+C47 | =A$2*E45+A$3*E46+A$4*E47+A$5*E48+A$6*E49 | =E47-G47 | =H47*H47 |
| 48 | | 354 | 0.7705 | =B48+C48 | =A$2*E46+A$3*E47+A$4*E48+A$5*E49+A$6*E50 | =E48-G48 | =H48*H48 |
| 49 | | 348 | 1.4454 | =B49+C49 | =A$2*E47+A$3*E48+A$4*E49+A$5*E50+A$6*E51 | =E49-G49 | =H49*H49 |

Fig.28A

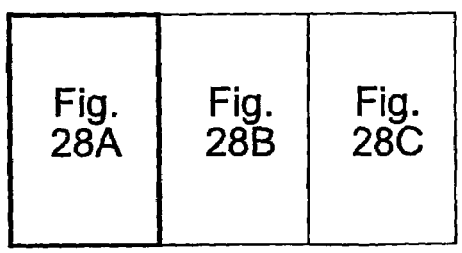

| | J | K | L |
|---|---|---|---|
| 1 | LOCAL_STD_DEV | | P(X|W+) |
| 2 | | | |
| 3 | | | |
| 4 | =SQRT( A$2*I2+A$3*I3+A$4*I4+A$5*I5+A$6*I6) | | =NORMDIST( E4+1, G4, J4, 0) |
| 5 | =SQRT( A$2*I3+A$3*I4+A$4*I5+A$5*I6+A$6*I7) | | =NORMDIST( E5+1, G5, J5, 0) |
| 6 | =SQRT( A$2*I4+A$3*I5+A$4*I6+A$5*I7+A$6*I8) | | =NORMDIST( E6+1, G6, J6, 0) |
| 7 | =SQRT( A$2*I5+A$3*I6+A$4*I7+A$5*I8+A$6*I9) | | =NORMDIST( E7+1, G7, J7, 0) |
| 8 | =SQRT( A$2*I6+A$3*I7+A$4*I8+A$5*I9+A$6*I10) | | =NORMDIST( E8+1, G8, J8, 0) |
| 9 | =SQRT( A$2*I7+A$3*I8+A$4*I9+A$5*I10+A$6*I11) | | =NORMDIST( E9+1, G9, J9, 0) |
| 10 | =SQRT( A$2*I8+A$3*I9+A$4*I10+A$5*I11+A$6*I12) | | =NORMDIST( E10+1, G10, J10, 0) |
| 11 | =SQRT( A$2*I9+A$3*I10+A$4*I11+A$5*I12+A$6*I13) | | =NORMDIST( E11+1, G11, J11, 0) |
| 12 | =SQRT( A$2*I10+A$3*I11+A$4*I12+A$5*I13+A$6*I14) | | =NORMDIST( E12+1, G12, J12, 0) |
| 13 | =SQRT( A$2*I11+A$3*I12+A$4*I13+A$5*I14+A$6*I15) | | =NORMDIST( E13+1, G13, J13, 0) |
| 14 | =SQRT( A$2*I12+A$3*I13+A$4*I14+A$5*I15+A$6*I16) | | =NORMDIST( E14+1, G14, J14, 0) |
| 15 | =SQRT( A$2*I13+A$3*I14+A$4*I15+A$5*I16+A$6*I17) | | =NORMDIST( E15+1, G15, J15, 0) |
| 16 | =SQRT( A$2*I14+A$3*I15+A$4*I16+A$5*I17+A$6*I18) | | =NORMDIST( E16+1, G16, J16, 0) |
| 17 | =SQRT( A$2*I15+A$3*I16+A$4*I17+A$5*I18+A$6*I19) | | =NORMDIST( E17+1, G17, J17, 0) |
| 18 | =SQRT( A$2*I16+A$3*I17+A$4*I18+A$5*I19+A$6*I20) | | =NORMDIST( E18+1, G18, J18, 0) |
| 19 | =SQRT( A$2*I17+A$3*I18+A$4*I19+A$5*I20+A$6*I21) | | =NORMDIST( E19+1, G19, J19, 0) |
| 20 | =SQRT( A$2*I18+A$3*I19+A$4*I20+A$5*I21+A$6*I22) | | =NORMDIST( E20+1, G20, J20, 0) |
| 21 | =SQRT( A$2*I19+A$3*I20+A$4*I21+A$5*I22+A$6*I23) | | =NORMDIST( E21+1, G21, J21, 0) |
| 22 | =SQRT( A$2*I20+A$3*I21+A$4*I22+A$5*I23+A$6*I24) | | =NORMDIST( E22+1, G22, J22, 0) |
| 23 | =SQRT( A$2*I21+A$3*I22+A$4*I23+A$5*I24+A$6*I25) | | =NORMDIST( E23+1, G23, J23, 0) |
| 24 | =SQRT( A$2*I22+A$3*I23+A$4*I24+A$5*I25+A$6*I26) | | =NORMDIST( E24+1, G24, J24, 0) |
| 25 | =SQRT( A$2*I23+A$3*I24+A$4*I25+A$5*I26+A$6*I27) | | =NORMDIST( E25+1, G25, J25, 0) |
| 26 | =SQRT( A$2*I24+A$3*I25+A$4*I26+A$5*I27+A$6*I28) | | =NORMDIST( E26+1, G26, J26, 0) |
| 27 | =SQRT( A$2*I25+A$3*I26+A$4*I27+A$5*I28+A$6*I29) | | =NORMDIST( E27+1, G27, J27, 0) |
| 28 | =SQRT( A$2*I26+A$3*I27+A$4*I28+A$5*I29+A$6*I30) | | =NORMDIST( E28+1, G28, J28, 0) |
| 29 | =SQRT( A$2*I27+A$3*I28+A$4*I29+A$5*I30+A$6*I31) | | =NORMDIST( E29+1, G29, J29, 0) |
| 30 | =SQRT( A$2*I28+A$3*I29+A$4*I30+A$5*I31+A$6*I32) | | =NORMDIST( E30+1, G30, J30, 0) |
| 31 | =SQRT( A$2*I29+A$3*I30+A$4*I31+A$5*I32+A$6*I33) | | =NORMDIST( E31+1, G31, J31, 0) |
| 32 | =SQRT( A$2*I30+A$3*I31+A$4*I32+A$5*I33+A$6*I34) | | =NORMDIST( E32+1, G32, J32, 0) |
| 33 | =SQRT( A$2*I31+A$3*I32+A$4*I33+A$5*I34+A$6*I35) | | =NORMDIST( E33+1, G33, J33, 0) |
| 34 | =SQRT( A$2*I32+A$3*I33+A$4*I34+A$5*I35+A$6*I36) | | =NORMDIST( E34+1, G34, J34, 0) |
| 35 | =SQRT( A$2*I33+A$3*I34+A$4*I35+A$5*I36+A$6*I37) | | =NORMDIST( E35+1, G35, J35, 0) |
| 36 | =SQRT( A$2*I34+A$3*I35+A$4*I36+A$5*I37+A$6*I38) | | =NORMDIST( E36+1, G36, J36, 0) |
| 37 | =SQRT( A$2*I35+A$3*I36+A$4*I37+A$5*I38+A$6*I39) | | =NORMDIST( E37+1, G37, J37, 0) |
| 38 | =SQRT( A$2*I36+A$3*I37+A$4*I38+A$5*I39+A$6*I40) | | =NORMDIST( E38+1, G38, J38, 0) |
| 39 | =SQRT( A$2*I37+A$3*I38+A$4*I39+A$5*I40+A$6*I41) | | =NORMDIST( E39+1, G39, J39, 0) |
| 40 | =SQRT( A$2*I38+A$3*I39+A$4*I40+A$5*I41+A$6*I42) | | =NORMDIST( E40+1, G40, J40, 0) |
| 41 | =SQRT( A$2*I39+A$3*I40+A$4*I41+A$5*I42+A$6*I43) | | =NORMDIST( E41+1, G41, J41, 0) |
| 42 | =SQRT( A$2*I40+A$3*I41+A$4*I42+A$5*I43+A$6*I44) | | =NORMDIST( E42+1, G42, J42, 0) |
| 43 | =SQRT( A$2*I41+A$3*I42+A$4*I43+A$5*I44+A$6*I45) | | =NORMDIST( E43+1, G43, J43, 0) |
| 44 | =SQRT( A$2*I42+A$3*I43+A$4*I44+A$5*I45+A$6*I46) | | =NORMDIST( E44+1, G44, J44, 0) |
| 45 | =SQRT( A$2*I43+A$3*I44+A$4*I45+A$5*I46+A$6*I47) | | =NORMDIST( E45+1, G45, J45, 0) |
| 46 | =SQRT( A$2*I44+A$3*I45+A$4*I46+A$5*I47+A$6*I48) | | =NORMDIST( E46+1, G46, J46, 0) |
| 47 | =SQRT( A$2*I45+A$3*I46+A$4*I47+A$5*I48+A$6*I49) | | =NORMDIST( E47+1, G47, J47, 0) |
| 48 | =SQRT( A$2*I46+A$3*I47+A$4*I48+A$5*I49+A$6*I50) | | =NORMDIST( E48+1, G48, J48, 0) |
| 49 | =SQRT( A$2*I47+A$3*I48+A$4*I49+A$5*I50+A$6*I51) | | =NORMDIST( E49+1, G49, J49, 0) |

Fig.28B

| Fig. 28A | Fig. 28B | Fig. 28C |
|---|---|---|

| | M | N | O | P |
|---|---|---|---|---|
| 1 | P(X\|W-) | Dlog( P(W+\|X)/P(W-\|X) )/DALPHA | P(W+ALPHA\|X)/P(W-ALPHA\|X) | P(W+\|X) |
| 2 | | | | |
| 3 | | | | |
| 4 | =NORMDIST( E4-1, G4, J4, 0) | =LOG(L4/M4)/2 | =EXP( N4 ) | =1/(O4+1) |
| 5 | =NORMDIST( E5-1, G5, J5, 0) | =LOG(L5/M5)/2 | =EXP( N5 ) | =1/(O5+1) |
| 6 | =NORMDIST( E6-1, G6, J6, 0) | =LOG(L6/M6)/2 | =EXP( N6 ) | =1/(O6+1) |
| 7 | =NORMDIST( E7-1, G7, J7, 0) | =LOG(L7/M7)/2 | =EXP( N7 ) | =1/(O7+1) |
| 8 | =NORMDIST( E8-1, G8, J8, 0) | =LOG(L8/M8)/2 | =EXP( N8 ) | =1/(O8+1) |
| 9 | =NORMDIST( E9-1, G9, J9, 0) | =LOG(L9/M9)/2 | =EXP( N9 ) | =1/(O9+1) |
| 10 | =NORMDIST( E10-1, G10, J10, 0) | =LOG(L10/M10)/2 | =EXP( N10 ) | =1/(O10+1) |
| 11 | =NORMDIST( E11-1, G11, J11, 0) | =LOG(L11/M11)/2 | =EXP( N11 ) | =1/(O11+1) |
| 12 | =NORMDIST( E12-1, G12, J12, 0) | =LOG(L12/M12)/2 | =EXP( N12 ) | =1/(O12+1) |
| 13 | =NORMDIST( E13-1, G13, J13, 0) | =LOG(L13/M13)/2 | =EXP( N13 ) | =1/(O13+1) |
| 14 | =NORMDIST( E14-1, G14, J14, 0) | =LOG(L14/M14)/2 | =EXP( N14 ) | =1/(O14+1) |
| 15 | =NORMDIST( E15-1, G15, J15, 0) | =LOG(L15/M15)/2 | =EXP( N15 ) | =1/(O15+1) |
| 16 | =NORMDIST( E16-1, G16, J16, 0) | =LOG(L16/M16)/2 | =EXP( N16 ) | =1/(O16+1) |
| 17 | =NORMDIST( E17-1, G17, J17, 0) | =LOG(L17/M17)/2 | =EXP( N17 ) | =1/(O17+1) |
| 18 | =NORMDIST( E18-1, G18, J18, 0) | =LOG(L18/M18)/2 | =EXP( N18 ) | =1/(O18+1) |
| 19 | =NORMDIST( E19-1, G19, J19, 0) | =LOG(L19/M19)/2 | =EXP( N19 ) | =1/(O19+1) |
| 20 | =NORMDIST( E20-1, G20, J20, 0) | =LOG(L20/M20)/2 | =EXP( N20 ) | =1/(O20+1) |
| 21 | =NORMDIST( E21-1, G21, J21, 0) | =LOG(L21/M21)/2 | =EXP( N21 ) | =1/(O21+1) |
| 22 | =NORMDIST( E22-1, G22, J22, 0) | =LOG(L22/M22)/2 | =EXP( N22 ) | =1/(O22+1) |
| 23 | =NORMDIST( E23-1, G23, J23, 0) | =LOG(L23/M23)/2 | =EXP( N23 ) | =1/(O23+1) |
| 24 | =NORMDIST( E24-1, G24, J24, 0) | =LOG(L24/M24)/2 | =EXP( N24 ) | =1/(O24+1) |
| 25 | =NORMDIST( E25-1, G25, J25, 0) | =LOG(L25/M25)/2 | =EXP( N25 ) | =1/(O25+1) |
| 26 | =NORMDIST( E26-1, G26, J26, 0) | =LOG(L26/M26)/2 | =EXP( N26 ) | =1/(O26+1) |
| 27 | =NORMDIST( E27-1, G27, J27, 0) | =LOG(L27/M27)/2 | =EXP( N27 ) | =1/(O27+1) |
| 28 | =NORMDIST( E28-1, G28, J28, 0) | =LOG(L28/M28)/2 | =EXP( N28 ) | =1/(O28+1) |
| 29 | =NORMDIST( E29-1, G29, J29, 0) | =LOG(L29/M29)/2 | =EXP( N29 ) | =1/(O29+1) |
| 30 | =NORMDIST( E30-1, G30, J30, 0) | =LOG(L30/M30)/2 | =EXP( N30 ) | =1/(O30+1) |
| 31 | =NORMDIST( E31-1, G31, J31, 0) | =LOG(L31/M31)/2 | =EXP( N31 ) | =1/(O31+1) |
| 32 | =NORMDIST( E32-1, G32, J32, 0) | =LOG(L32/M32)/2 | =EXP( N32 ) | =1/(O32+1) |
| 33 | =NORMDIST( E33-1, G33, J33, 0) | =LOG(L33/M33)/2 | =EXP( N33 ) | =1/(O33+1) |
| 34 | =NORMDIST( E34-1, G34, J34, 0) | =LOG(L34/M34)/2 | =EXP( N34 ) | =1/(O34+1) |
| 35 | =NORMDIST( E35-1, G35, J35, 0) | =LOG(L35/M35)/2 | =EXP( N35 ) | =1/(O35+1) |
| 36 | =NORMDIST( E36-1, G36, J36, 0) | =LOG(L36/M36)/2 | =EXP( N36 ) | =1/(O36+1) |
| 37 | =NORMDIST( E37-1, G37, J37, 0) | =LOG(L37/M37)/2 | =EXP( N37 ) | =1/(O37+1) |
| 38 | =NORMDIST( E38-1, G38, J38, 0) | =LOG(L38/M38)/2 | =EXP( N38 ) | =1/(O38+1) |
| 39 | =NORMDIST( E39-1, G39, J39, 0) | =LOG(L39/M39)/2 | =EXP( N39 ) | =1/(O39+1) |
| 40 | =NORMDIST( E40-1, G40, J40, 0) | =LOG(L40/M40)/2 | =EXP( N40 ) | =1/(O40+1) |
| 41 | =NORMDIST( E41-1, G41, J41, 0) | =LOG(L41/M41)/2 | =EXP( N41 ) | =1/(O41+1) |
| 42 | =NORMDIST( E42-1, G42, J42, 0) | =LOG(L42/M42)/2 | =EXP( N42 ) | =1/(O42+1) |
| 43 | =NORMDIST( E43-1, G43, J43, 0) | =LOG(L43/M43)/2 | =EXP( N43 ) | =1/(O43+1) |
| 44 | =NORMDIST( E44-1, G44, J44, 0) | =LOG(L44/M44)/2 | =EXP( N44 ) | =1/(O44+1) |
| 45 | =NORMDIST( E45-1, G45, J45, 0) | =LOG(L45/M45)/2 | =EXP( N45 ) | =1/(O45+1) |
| 46 | =NORMDIST( E46-1, G46, J46, 0) | =LOG(L46/M46)/2 | =EXP( N46 ) | =1/(O46+1) |
| 47 | =NORMDIST( E47-1, G47, J47, 0) | =LOG(L47/M47)/2 | =EXP( N47 ) | =1/(O47+1) |
| 48 | =NORMDIST( E48-1, G48, J48, 0) | =LOG(L48/M48)/2 | =EXP( N48 ) | =1/(O48+1) |
| 49 | =NORMDIST( E49-1, G49, J49, 0) | =LOG(L49/M49)/2 | =EXP( N49 ) | =1/(O49+1) |

Fig.28C

| Fig. 28A | Fig. 28B | Fig. 28C |
|---|---|---|

DATA PROCESSING APPARATUS AND METHOD

FIELD OF INVENTION

The present invention relates to an apparatus and a method for detecting watermark code words in a received image signal representing a watermarked image.

BACKGROUND OF THE INVENTION

Generally, a technique for embedding data in material to the effect that the embedded data is perceptible or imperceptible in the material is referred to as water marking. Code words are applied to versions of material items for the purpose of identifying the version of the material item or for conveying data represented by the code words. In some applications, water marking can provide, therefore, a facility for identifying a particular version of the material.

A process in which information is embedded in material for the purpose of identifying a specific version of the material is referred to as finger printing. A code word, which identifies the material, is combined with the material in such a way that, as far as possible, the code word is imperceptible in the material. As such, if the material is copied or used in a way, which is inconsistent with the wishes of the owner, distributor or other rights holder of the material, the material version can be identified from the code word and take appropriate action.

In order to detect a code word in a marked material item, it is known to recover an estimate of the code word from the marked material item and to identify the code word by correlating each of a possible set of code words with the estimated code word. The code word is detected by comparing a result of the correlation with a predetermined threshold. If the correlation result exceeds the threshold then the code word of the set, which generated the correlation result is considered to have been detected. Typically, in order to recover the estimated code word from the marked material, a copy of the original version of the material item is subtracted from the suspected marked material item. However, it may not always be possible to reproduce an original copy of the image at the detecting data processing apparatus.

In applications of finger printing to cinema, a water marked copy of a cinema image is displayed on a cinema screen. If a cinema film is then copied using, for example a hand-held video camera, to make a pirate copy, then the pirate copy can be identified, by detecting the code word, which will also be present in the pirate copy. Typically, the pirate copy of the film may suffer some distortion, either as a result of copying or as a result of processing performed on the pirate copy. For example, the original image may be distorted as a result of an angle of the video camera producing the copy with respect to the cinema screen. If the marked image is distorted in the pirate copy, then a likelihood of correctly detecting a code word, which is present in the image may be reduced. It is therefore known to register the marked image with respect to an original copy of the image so that when the original is subtracted from the registered marked copy, a code word present in the marked image will be closer to an original form of the code word. A likelihood of not detecting a code word, which is present in the marked image (false negative detection probability), is thereby reduced.

SUMMARY OF THE INVENTION

An object of the present invention is to register water marked images without a requirement to compare the water marked images with an original of the images.

According to an aspect of the present invention there is provided a data processing method for detecting a watermark codeword in a received image signal representing a watermarked image. The watermarked image comprises a plurality of signal samples each of which represents a pixel value of the image, to which a watermark codeword coefficient value has been added. The method comprises the steps of low pass filtering the received image signal to generate, for each signal sample, a local mean value, subtracting the local mean from the received image signal to generate a residual signal comprising, for each signal sample, a residual value, and determining, from the residual signal, a local standard deviation for each signal sample. The method also comprises the step of generating, for each signal sample, a watermark strength value providing an estimate of the magnitude with which the watermark codeword coefficient has been added to the received image signal sample. The method also comprises the steps of generating, for each signal sample, a first gaussian likelihood function describing the likelihood of the watermark codeword coefficient embedded into the signal sample being positive, the first gaussian likelihood function having a mean defined by the sum of the local mean value and the watermark strength value and a standard deviation defined by the local standard deviation and generating, for each signal sample, a second gaussian likelihood function describing the likelihood of the watermark codeword coefficient embedded into the signal sample being negative, the second gaussian likelihood function having a mean defined by the difference between the local mean value and the watermark strength value and a standard deviation defined by the local standard deviation. When the above likelihood functions have been generated, the method can detect a watermark in the received watermark image based on the probability of the watermark codeword coefficients added to each signal sample being one of positive or negative, the probability being calculated from the first and second likelihood functions. This provides an estimate of the positioning of the watermark within the received watermark image and allows improved soft decoding of payload data in scenarios where synchronisation can be assumed.

Generating likelihood functions, and consequently probabilities of watermark codeword coefficients being either positive or negative in a given region of the received image, from a gaussian distribution using local mean and standard deviation values derived from the received signal has been found to provide an effective first estimate of watermark positioning within a watermark image.

In one embodiment, the first and second gaussian likelihood functions will be used to generate a linear approximation as a function of watermark strength describing the probability that the watermark value embedded in the signal sample is positive. This possibility is particularly advantageous where a revised estimate of watermark strength will be provided after the initial receipt of the image signal. While the generation of the likelihood functions is computationally demanding, the application of the linear approximation to the revised watermark strength is not, and so the probability generation process can be made more efficient.

The first and second gaussian likelihood functions can be generalised gaussian functions having a shape parameter. The shape parameter can be adapted for each signal sample to provide improved watermark detection performance.

Embodiments of the present invention provide data processing apparatus which can register water marked images without a requirement to compare the water marked images with an original of the images. As such distortion vectors identifying distortion within the image can be identified and the effects of the distortion reduced to increase a likelihood of correctly detecting payload data which may be represented by the water mark code word. Furthermore, an improvement can be made in the acquisition of frame synchronisation for the sequence of image frames. As such, in some embodiments payload data words may be communicated by more than one data frame.

Various further aspects and features of the present invention are defined in the appended claims. These aspects include an apparatus for detecting a water mark in an image frame, and a computer program.

BRIEF DESCRIPTION OF THE DRAWINGS

Embodiments of the present invention will now be described by way of example only with reference to the accompanying drawings, where like parts are provided with corresponding reference numerals, and in which:

FIG. 27 is a table schematically illustrating example data used to generate FIGS. 9, 10 and 12; and FIGS. 28A to 28C schematically illustrate the formulae used in conjunction with the values of FIG. 27 to generate FIGS. 9, 10 and 12.

DESCRIPTION OF EXAMPLE EMBODIMENTS

Water Mark Encoder

Figure 1:
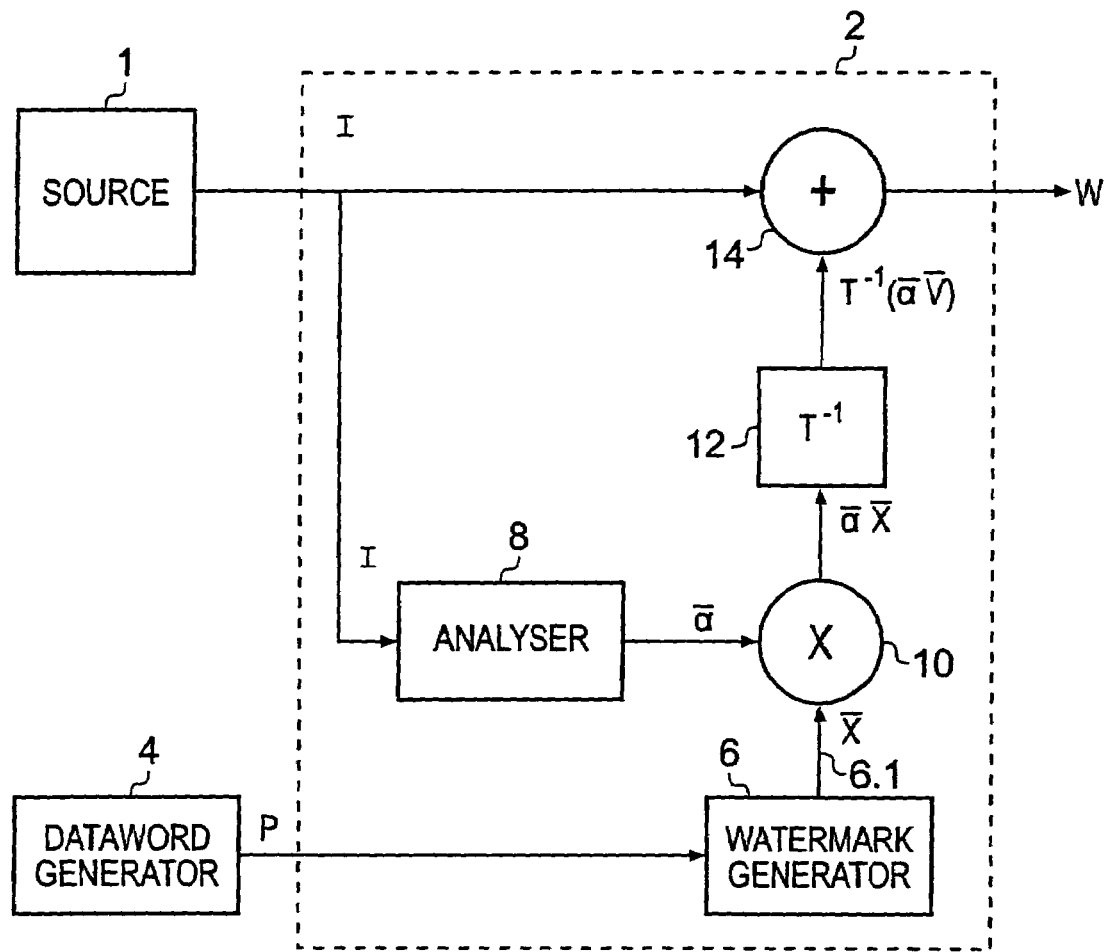
FIG. 1 is a schematic block diagram of an encoding apparatus for combining an image with a code word.

An encoding data processing apparatus, which is operable to generate water marked images by combining a water mark code word with the images, is shown in FIG. 1. The encoding data processing apparatus shown in FIG. 1 is arranged to combine the code word with the image to form the marked copy in a base band domain of the original image. In FIG. 1 images I are generated by a source 1 and fed to an encoder 2 which is arranged to combine payload data words P generated by a data word generator 4 so that at the output of the encoder 2 a marked copy W of the images I is formed. The encoder 2 shown in FIG. 1 includes a code word generator 6 which arranges the code word coefficients into a form corresponding to a transform domain representation of the image. Weighting factors are then generated by a perceptual analyser 8 in accordance with a relative ability of the image to carry the code word coefficients with a maximum strength whilst minimising a risk of the code word being perceivable when added to the image I. The weighting factors are received by a strength adaptor 10 and combined with the code word coefficients to form weighted code word coefficients. The weighted code word coefficients are then transformed into the base band domain by an inverse transform processor 12, which performs an inverse transform on the code word. The base-band domain code word is then combined with the base band domain image by a combiner 14 to form the marked copy of the image W.

In the following description the term "samples" will be used to refer to discrete samples from which an image is comprised. The samples may be luminance samples of the image, which is otherwise, produce from the image pixels. Therefore, where appropriate the term samples and pixels are inter-changeable.

In some embodiments utilising the present technique, the transform domain representation of the code word may include a Discrete Cosine Transform (DCT), a Fourier Transform or a Discrete Wavelet Transform. For example, the code word could be formed as if in a DCT domain, so that the inverse transform processor 12 may be arranged to perform an inverse DCT on the code word coefficients before being spatially and/or temporally up-sampled. Accordingly the code word may be spread more evenly across the frequency band of the image.

According to one example, the transform domain representation includes either a temporal and/or spatial down-sampled representation with respect to a sampling rate of the base band domain image. The code word is therefore arranged in a form or treated as if the code word were in a form in which it had been spatially and/or temporally down-sampled with respect to the base band version. As such the inverse transform processor is arranged to temporally and/or spatially up-sample the code word coefficients to form a base band version of the code word, in which form the code word is combined with the base band image I to form the marked copy of the image W.

Figure 2:
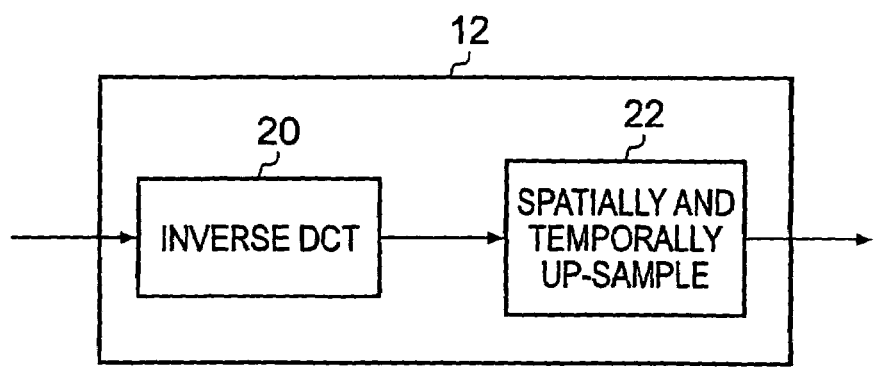
FIG. 2 is a schematic block diagram of an inverse transform processor forming part of the apparatus shown in FIG. 1.

An example of an inverse transform processor 12 is shown in FIG. 2 in more detail. As shown in FIG. 2, the inverse transform processor 12 includes an inverse DCT transformer 20 which performs an inverse DCT on the down-sampled code word as formed into a DCT domain image. An up-sampling processor 22 is then operable to spatially and/or temporally up-samples the code word to provide a sampling rate which corresponds to that of the base band domain image.

According to the present technique water mark code words are generated in the form of water mark patterns and combined with each frame of a video source which form a water mark image. The water mark patterns are formed as a combination of two dimensional blocks each of which is added to a correspondingly sized region of an area of the image. An example is illustrated in FIG. 3.

Figure 3:
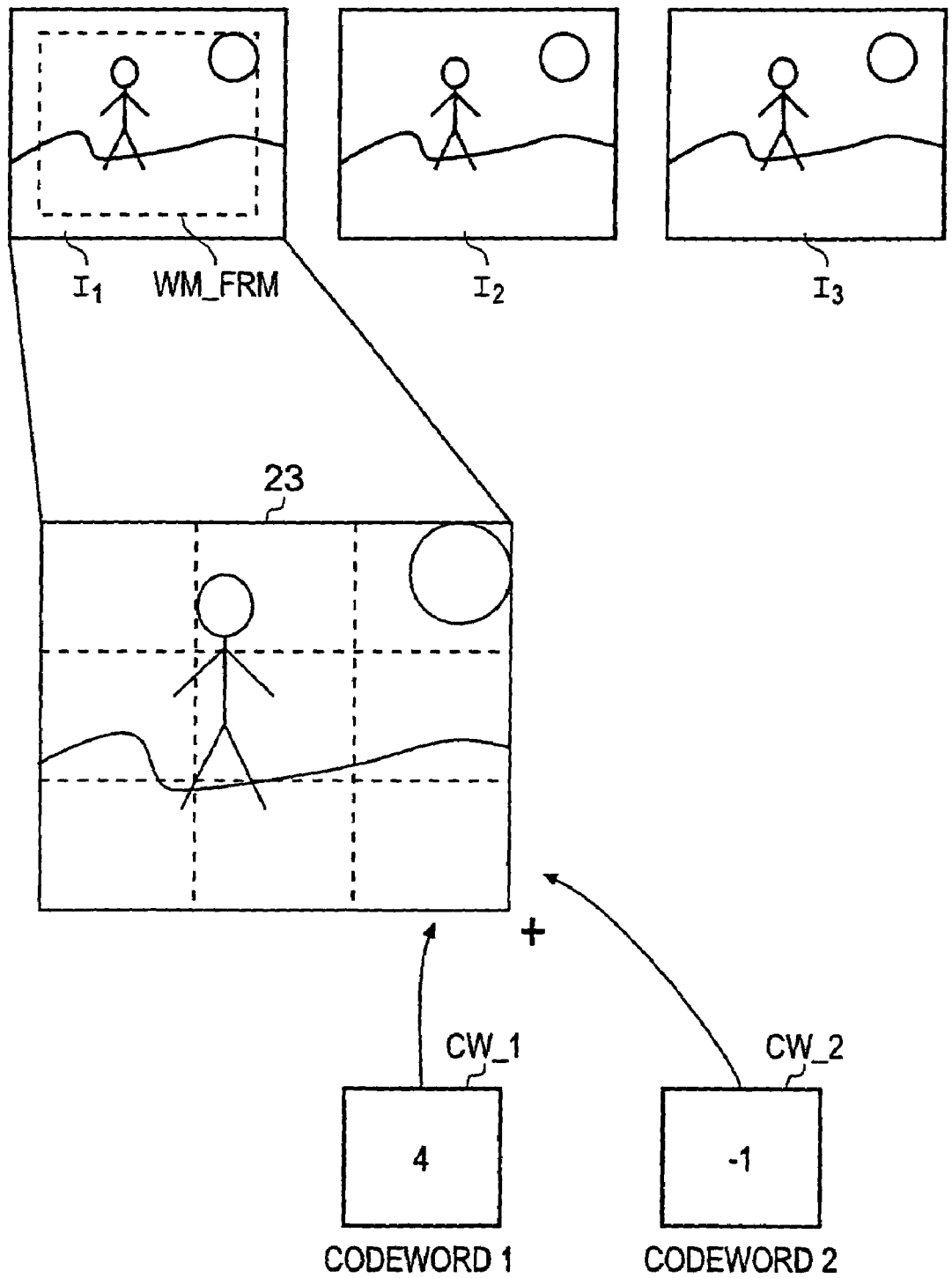
FIG. 3 is a schematic illustration of the operation of the encoding data processor shown in FIG. 1.

In FIG. 3 each of a series of three image frames $I_1$, $I_2$, $I_3$ are illustrated as comprising a particular content of an image scene. Within the image frame a smaller rectangular area WM_FRM is shown in an expanded form 23. For the present example the water marked image frame WM_FRM comprises nine equally sized sections formed by dividing equally the water marked image frame WM_FRM. The watermark code word is added throughout the image frame. If part of the frame is lost as a result of cropping, then more frames may be required to decode the payload.

According to the present technique a correspondingly sized block is generated and combined with each of the regions of the water marked image frame to the effect that the size of the block corresponds to the size of the region. As will be explained with reference to FIG. 4 the present technique uses two water marks which are overlaid. That is to say a water mark block for a first code word CW_1 is combined with each region and a water marked block from a second code word CW_2 is combined with the same region. As will be explained the first code word CW_1 pattern of blocks is provided in order to perform blind registration of a received water marked image whereas the second codeword is used to convey payload data. The water mark generator 6 is shown in more detail in FIG. 4.

Figure 4:
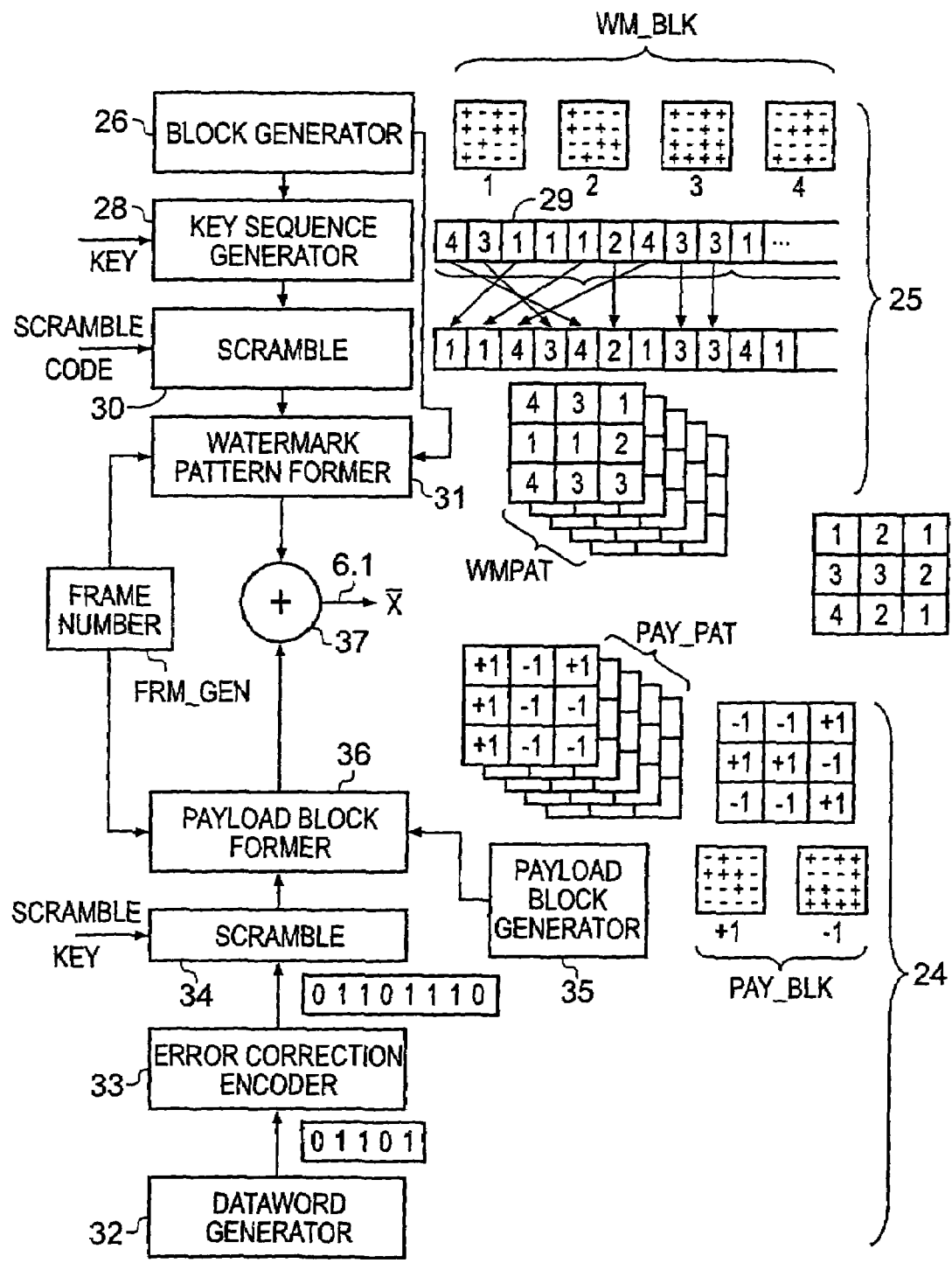
FIG. 4 is a part schematic block diagram, part schematic illustration of the operation of a water mark code word generator appearing in FIG. 1.

A water mark generator for generating a first water mark frame is illustrated in the lower half 24 of FIG. 4 whereas the upper half 25 of FIG. 4 illustrates parts of the water mark generator 6 which generate a second water mark pattern. The first water mark referred to as a payload water mark and is generated to represent payload data conveyed by the water marked image. The second water mark pattern is used to detect distortion and identify a frame number within the video image sequence so that the water marked image sequence can be registered without a requirement for an original version of the image sequence.

In FIG. 4 a first block generator 26 is arranged to provide a sequence of water mark blocks providing a two dimensional arrangement of code word coefficients. As illustrated in FIG. 4 for the present example the block generator 6 generates four blocks of a predefined group each of which provides a two dimensional arrangement of water marks code word coefficients. As mentioned above this water mark is for permitting registration of the watermarked image and frame synchronisation. Within the code word generator 6 a key sequence generator 28 is provided using a key to generate a long sequence of index numbers within a predetermined range of numbers corresponding to a number of different water marked code word blocks generated by the block generator 26. Each of the block numbers of the long key sequence 29 is scrambled by a scrambler 30 with the effect that each of the block numbers which are to form a water mark pattern for one of the frames are re-arranged in accordance with a predetermined scrambling code. The scrambled key sequence is then fed to a water mark pattern former 31 which forms a water mark pattern per image frame by using the index numbers provided within the long key sequence to select one of the four water marked blocks WM_BLK. Thus as illustrated in FIG. 4 the water mark pattern generator forms water mark patterns WM_PAT. The water mark pattern former 31 also receives a frame number which identifies the respective frame to which a particular one of the water mark patterns WM_PAT is to be added. The length of the long key sequence may be such that a different water mark pattern is generated for each of a predetermined sequence of frames, before the sequence repeats.

In some embodiments, a watermark pattern may be non-periodic in that the pattern does not have a temporal period. This is done using a number of secretly keyed jumps. For example, if at the decoder, the decoder determines that the most likely current frame number is 527, then there is a 50% chance that the next frame will be 528 and a 50% chance that the next frame will be 35. As a result, it is more difficult for an attacker to correctly estimate the frame number.

According to the present technique the watermark pattern WM_PAT is formed by cyclically shifting the reference pattern from one frame to the next before scrambling. This can be effected either as one step of the cycle or as a keyed jump in the cycle providing a keyed number of cyclic shifts of the pattern from one frame to the next.

The water mark payload generator illustrated in the lower half 24 of FIG. 4 comprises a data word generator 32 which generates the payload data which is to be conveyed by the water marked image sequence. The data word is then error correction encoded by an encoder 33 before being scrambled by a corresponding scrambler 34 using a second scrambling code to scramble the bits of the encoded data word. A payload block generator 35 generates one of two two-dimensional payload blocks PAY_BLK comprising code word coefficients which are to be added to one of the regions of the water marked frame WO_FRM. One of the payload water mark blocks is to be representative of a one (+1) and the other which is formed from an inverse of the water marked code word coefficients is to represent a minus one (−1) or a zero within the encoded payload code word.

The scrambled and error correction encoded code word is received by a payload block former 36 is used to select a minus one block (−1) for a value zero and a plus one block (+1) for a value 1. Each of the bits in the encoded payload data word is therefore assigned to one of the regions of each of the water mark image frames. The payload block former 36 is operable to select the corresponding payload water mark block depending on whether a 0 or 1 is present in the encoded code word. Thus the payload patterns PAY_PAT are formed for each image frame.

The payload watermark pattern is also a water mark pattern although this will be referred to as a payload code words or a payload water marked pattern in order to distinguish this from the water marked pattern to be used for detecting distortion and the frame number in accordance with a blind registration method and apparatus which will be described shortly. Finally as illustrated in FIG. 4 the water marked pattern formed by the water marked pattern former 31 is fed to a combiner 37 with a water marked pattern from the payload block former 36. The two water mark code words are combined together to produce on an output conductor 6.1 a composite water mark code word for each frame in the form of a two dimensional water mark pattern. As illustrated in FIG. 3 the water mark pattern is combined with the images of the video sequence to be water marked.

Figure 5:
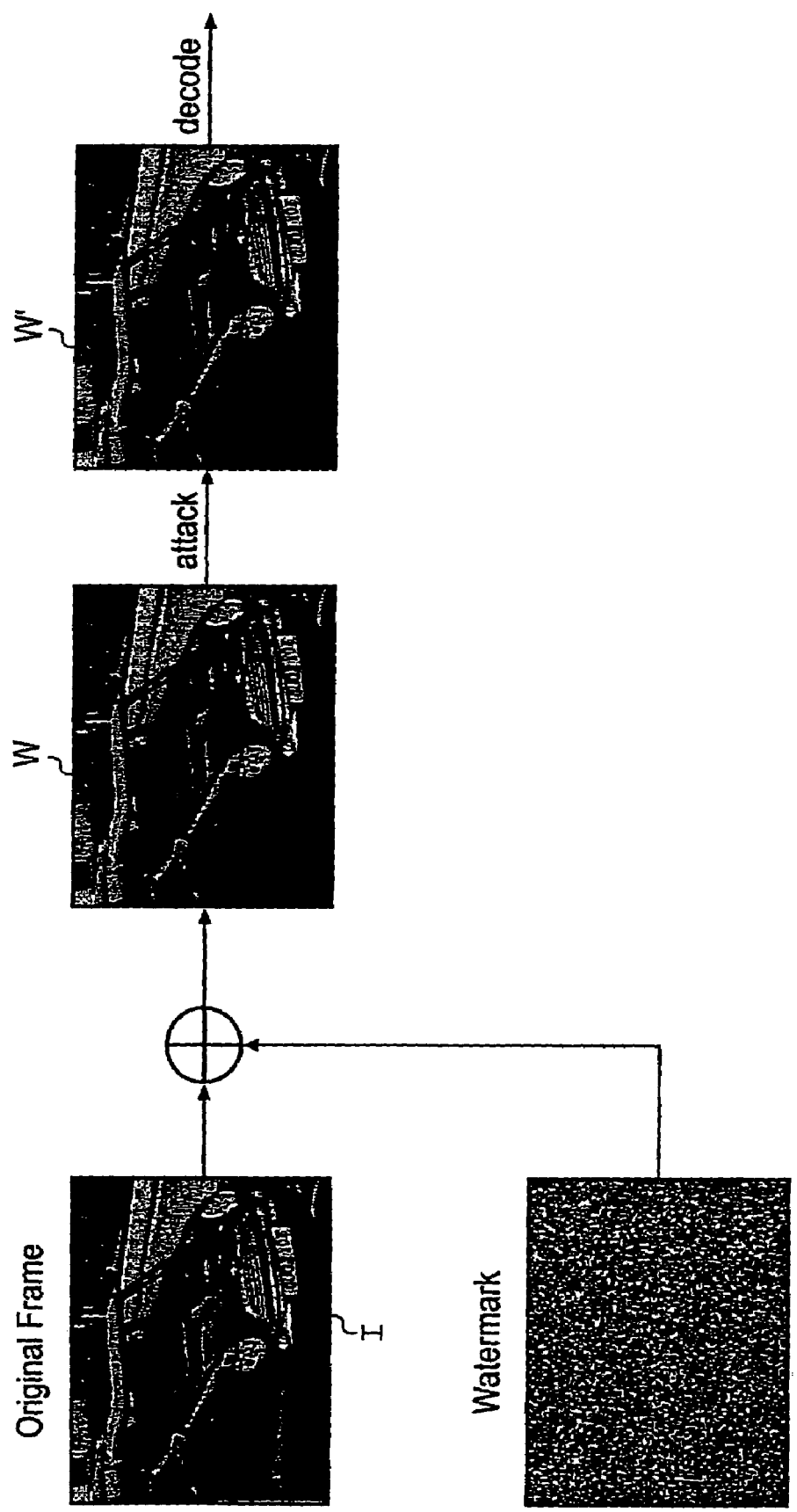
FIG. 5 is an example illustration of an original image with a water marked version of the image which has been distorted, and from which the distortion should be removed to detect the code word present in the marked image.

FIG. 5 provides an example illustration of a technical problem which the detecting apparatus is required to ameliorate in order to detect a code word in the water marked image W'. As shown in FIG. 5, a water marked image W is formed by combining a water mark code word X with a copy of the original image I. Distortion may be applied to the water marked image either deliberately by an attacker aiming to disrupt the water marking system or at a time of capture of the water marked image. As a result a distorted version of the water marked image W' is formed, from which the code word embedded in the image must be detected in order to identify the water marked image.

Detecting Processor

Figure 6:
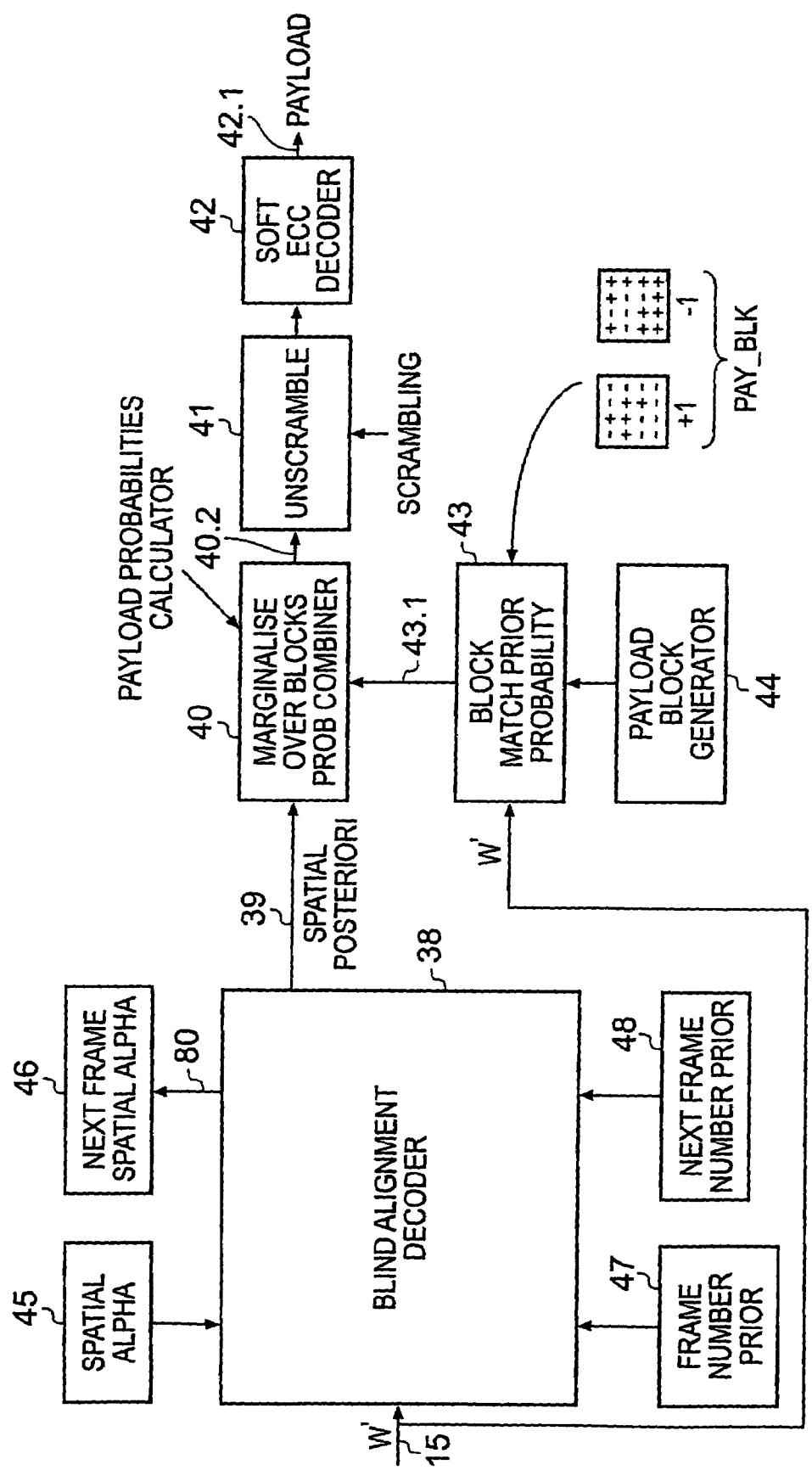
FIG. 6 is a schematic block diagram of detecting data processor, which is arranged to detect payload data conveyed by the water marked image.

According to the present technique the payload data is recovered from the water marked image produced by the encoder illustrated in FIG. 3 without using a copy of the original image. That is a so-called blind registration process is performed in which the original water marked image is processed to identify any distortion within the water marked image and to identify each of the corresponding original frame numbers of the encoded image so that the payload data can be recovered. FIG. 6 provides an example detecting apparatus, which can be used in accordance with the present technique.

In FIG. 6 a water marked image sequence is received by a blind alignment decoder 38 which is operable to calculate for each region within the water mark frame area W_FRM shown in FIG. 3 a probability distribution of possible distortion vectors for that region for each image, which form spatial posteriori probabilities. Whilst a most likely distortion vector could be calculated for each region, in some examples of the present technique, a most likely distortion vector is not selected, but rather a probability distribution of possible distortion vectors is maintained to provide 'soft decision' information. The blind alignment decoder 38 uses the first water mark pattern (registration water mark) to calculate the spatial posteriori probabilities and to determine frame synchronisation. The spatial posteriori probabilities are supplied on a channel 39 to a payload probabilities calculator 40. The payload probabilities calculator 40 also receives for each region of each frame a probability surface that the region contained a positive water mark block and a probability surface that the region contained a negative water mark block. To obtain a scalar probability value from the probability surfaces that the region contains a positive watermark block or a negative watermark block, the spatial variables are marginalised. The payload probabilities calculator 40 then unscrambles the probability values associated with each region in accordance with a scrambling code used at the encoder to form error correction encoded data words with each bit being represented by a probability value of that bit being a one and a probability value of that bit being a zero. These payload probability values are fed to a soft decision decoder 42 in order to perform soft decision error correction decoding to recover the payload data with an increased likelihood that payload data represented the water marked video images can be recovered correctly.

As illustrated in FIG. 6 the block match prior probability calculator 43 receives reproduced versions of the payload water mark blocks PAY_BLK. As will be explained shortly the block match prior probability calculator 43 can correlate each of the different water mark payload blocks PAY_BLK with respect to a corresponding region within the water marked image in order to generate the probability surfaces of the likelihood of the positive and negative payload blocks.

The blind alignment decoder 38 uses two data stores 45, 46 for storing spatial alpha probabilities and next frame spatial alpha probabilities and two data stores 47, 48 for storing frame number prior probabilities and next frame number prior probabilities. The operation and utilisation of the data stores will be explained in the following section with reference to FIG. 7, which provides and explanation of the operation of the blind alignment decoder 38.

Figure 7:
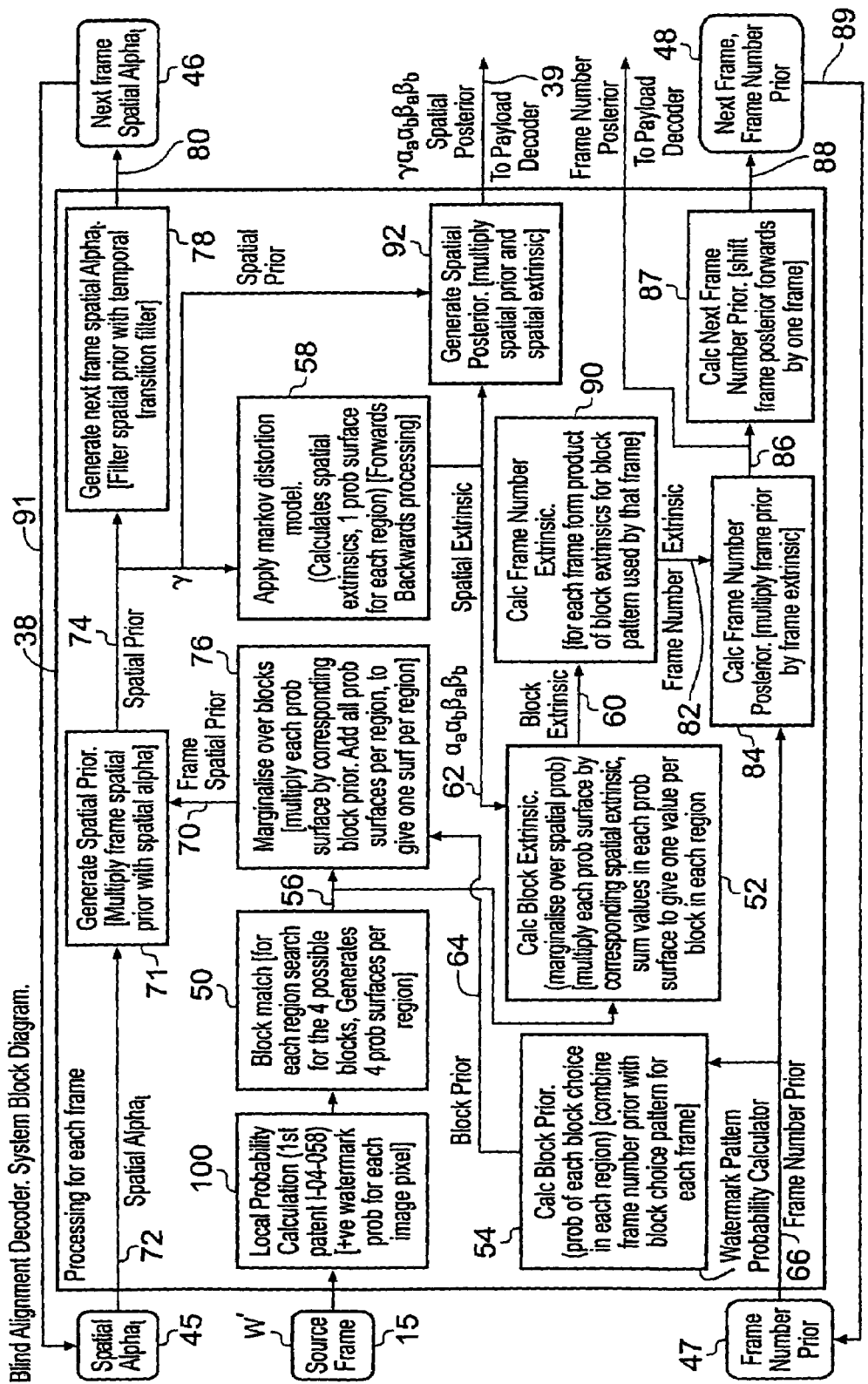
FIG. 7 is a schematic block diagram of a blind alignment decoder which appears in FIG. 6, which is operable to calculate distortion probability vectors and frame synchronisation.

In FIG. 7 the water marked image frames are received by a block matched prior probability calculator 50 via a local probability calculation function 100. The local probability calculation function serves to generate a likelihood of detecting the regions of the water marked image. The operation of the local probability calculator is explained now in more detail with reference to FIG. 8.

Figure 8:
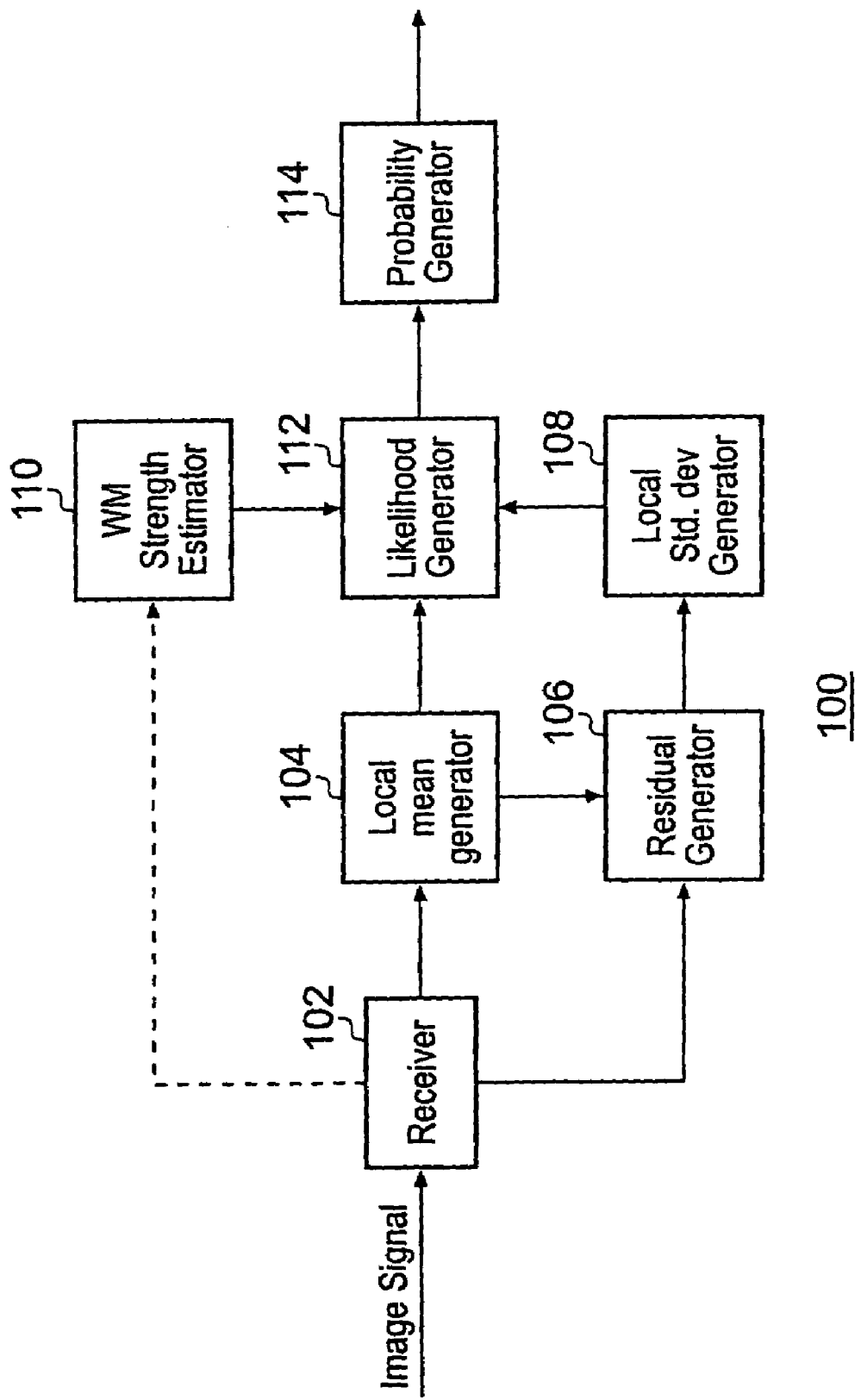
FIG. 8 schematically illustrates a local probability calculator according to an embodiment of the invention.

Referring to FIG. 8, a local probability calculator 100 according to an embodiment of the invention comprises a receiver 102 which receives an image signal representing a source frame. The image signal comprises a plurality of signal samples, each representing a pixel value, such as luminance or chrominance, of the source frame. The source frame has been previously generated by combining an original image frame with a watermark. The receiver 102 routes the received image signal to several functional units of the local probability calculator 100. One of these functional units is a local mean generator 104. The local mean generator 104 receives the image signal from the receiver 102, and generates, in respect of each signal sample, a local mean based on the pixel value of the signal sample and of neighbouring signal samples. Another of the functional units is a residual generator 106, which receives both the image signal, and a local mean signal from the local mean generator 104. The residual generator 106 determines the difference between the received image signal and the local mean signal for each signal sample. This difference is represented as a residual signal. The residual signal is routed to a local standard deviation generator 108 which determines a local standard deviation in respect of each signal sample in the received image signal.

The local probability calculator 100 also comprises a watermark strength estimator 110 which provides an estimate of the strength of the watermark added to or subtracted from the original image to generate the received image frame. The watermark strength may operate on predetermined assumptions without knowledge of the watermark added to the image frame, or may have limited or extensive knowledge regarding the watermark added to the image frame. The watermark strength may or may not be estimated using the received signal. If the watermark strength is to be estimated using the received signal, the receiver 102 provides the watermark strength estimate 110 with the received signal. This is illustrated by the presence of the dashed line connecting the receiver 102 and the watermark strength estimator 110. The watermark strength estimator 110 may provide more than one estimate of watermark strength, including an initial estimate based on limited knowledge of the watermark added to the image frame and a revised estimate based on more extensive knowledge of the watermark added to the image frame. The more extensive knowledge might include specific information relating to the decoder and the destination of the image frame.

The local probability calculator 100 comprises a likelihood generator 112 which generates, in respect of each signal sample, likelihood functions describing the likelihood of a watermark signal added to the signal sample being either positive or negative. The likelihood functions are generated from the watermark strength estimate provided from the watermark strength estimator 110, the local mean generated by the local mean generator 104 and the local standard deviation generated from the local standard deviation generator 108. The likelihood functions are functions of the received image signal, and substitution of the received image signal for the current pixel into the likelihood functions results in two likelihoods. These are the likelihood of the watermark being positive, given the received value of the received image signal, and the likelihood of the watermark being negative, given the received value of the received image signal.

The likelihoods determined by the likelihood generator 112 are then passed to a probability generator 114 which generates, from the two likelihoods, either or both of the probability of the watermark being positive in respect of a particular signal sample, given the received image signal value for that signal sample, and the probability of the watermark being negative in respect of the particular signal sample, given the received image signal value for that signal sample. These probabilities, when generated in respect of part or all of the received image frame, facilitate the detection of the watermark within the image frame.

Figure 9:
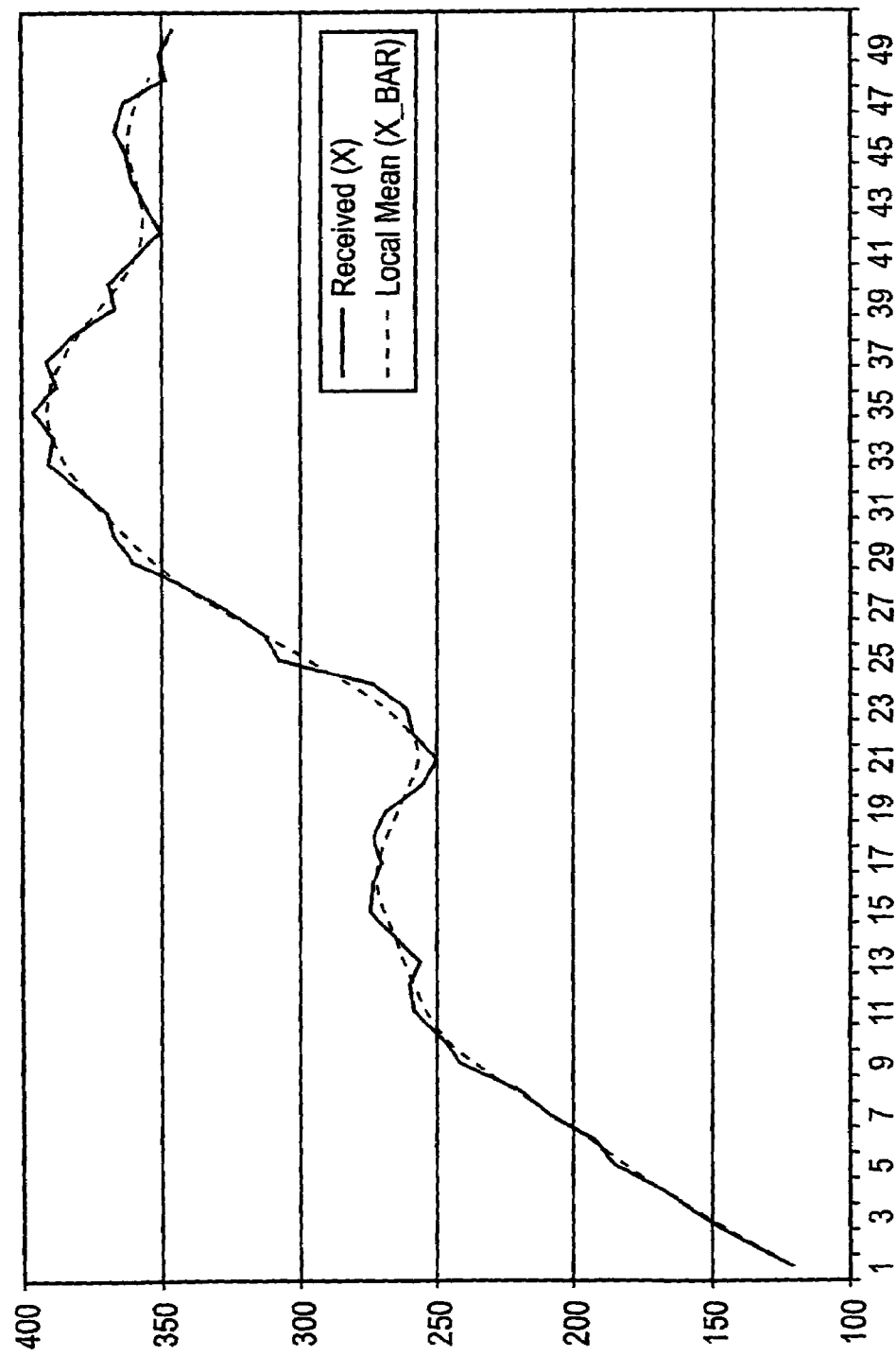
FIG. 9 schematically illustrates the operation of the receiver and local mean generator of FIG. 8.

FIG. 9 schematically illustrates the operation of the receiver 102 and the local mean generator 104. Specifically, FIG. 9 is a graph describing a received signal and a local mean of the received signal for an example image frame. This graph is a one-dimensional simplification of the process, which would usually be carried out in two dimensions and thereby define a surface rather than a line. It therefore represents a one dimensional visualization of a two dimensional problem. FIG. 9 illustrates the process as would be applied to a single line or column of the image frame and illustrates the same principles more clearly than would be the case for a two-dimension representation. The received signal of FIG. 9 comprises 50 samples, shown on the x-axis of the graph. The y-axis of the graph represents the signal strength in respect of each of the 50 signal samples. The continuous line represents the received signal at the received 102. The received signal has a general large scale trend which can be described by a gradual increase in signal strength from sample 1 to sample 16, followed by a gradual decline in signal strength from sample 16 to sample 21, followed by a gradual increase in signal strength from sample 21 to sample 35 and so on.

In addition to the gradual trends, there are local high frequency changes in signal strength. These may be part of the original image itself, or they may be present as a result of the addition of a watermark signal. Without prior knowledge of the watermark signal it is not possible to know for sure. However, in general the watermark signal will comprise higher frequency changes in signal strength than the original image itself. The watermark codeword represents an approximately white noise signal which is added to the low frequencies of the source image. Images tend to contain more low frequency energy than high frequency energy, so that if a watermark codeword is being estimated then an improvement in the signal-to-noise ratio of the watermark can be provided by rejecting the low frequencies of the image. The image may still dominate the remaining estimated watermark. However, the signal to noise ratio is improved. From the point of view of the low-pass signal, the image dominates in the low frequency band, so that filtering provides a reasonable estimate of the image. Accordingly, by smoothing the image signal, thereby attenuating high frequency changes in signal strength, the signal to noise ratio of the original signal will in general be improved compared to that of the watermark signal. A local mean signal, generated by low-pass filtering the received signal, is represented by a broken line of the graph of FIG. 9. It can be seen that the local mean signal follows the general trends of the received signal but lacks the high frequency changes of the received signal. Note that in a real two-dimensional image, the low-pass filtering will take into account neighbouring pixels in both dimensions.

Given that the local mean signal provides an estimated approximation of the original signal, it will be appreciated that the difference between the local mean signal and the received signal provides an estimated approximation of the watermark signal. This is illustrated schematically in FIG. 10, which illustrates the operation of the residual generator 106 and the local standard deviation generator 108. As with FIG. 9, the x-axis represents the signal samples within the signals, and the y-axis represents the signal strength associated with each signal sample. The continuous line represents a residual signal obtained by subtracting the local mean signal from the received signal. The dashed line represents a local standard deviation signal obtained from the residual signal. While a number of methods may be used to determine, for each signal sample, a standard deviation from the residual signal value, in the present case the residual signal sample is squared, to generate a squared signal constituted entirely of positive values, then the squared signal is low pass filtered to generate a local average of the squared signal, and then finally the filtered signal is square rooted to generate the standard deviation of the signal sample. In the present case, the same low-pass filter has been used both for the generation of the local mean, and the local standard deviation. However, different low-pass filters can be used for these two purposes.

Figure 11:
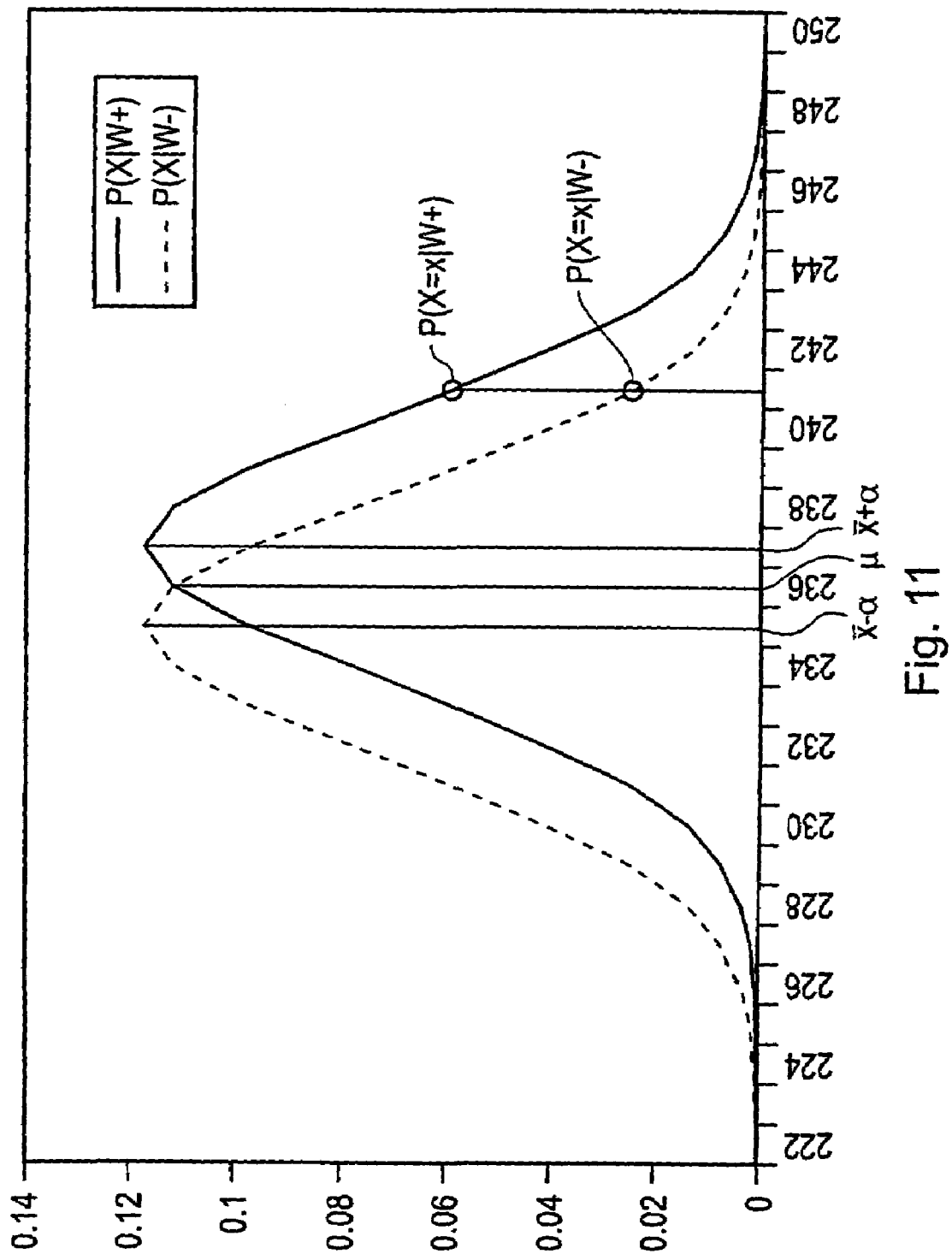
FIG. 11 schematically illustrates the operation of the watermark strength estimator and likelihood generator of FIG. 8.

FIG. 11 schematically illustrates the operation of the watermark strength estimator 110 and the likelihood generator 112. FIG. 11 shows two overlapping gaussian curves plotted on a graph having an x-axis representing signal strength and a y-axis representing likelihood. The right-most of these curves, represented by a continuous line, represents a first likelihood function which defines, as a function of signal strength, the likelihood of a watermark signal added to the original image frame being positive. The left-most of these curves, represented by a dashed line, represents a second likelihood function which defines, as a function of signal strength, the likelihood of a watermark signal added to the original image frame being negative. The mean of the first likelihood function is the local mean generated by the local mean generator 104, positively biased by the estimated watermark strength determined by the watermark strength estimator 110. The mean of the second likelihood function is the local mean generated by the local mean generator 104, negatively biased by the estimated watermark strength determined by the watermark strength estimator 110. Accordingly, the two guassian functions are offset from one another by an amount equal to twice the estimated watermark strength. For both the first and second likelihood functions, the standard deviation is the local standard deviation generated by the local standard deviation generator 108. The guassian curves of the likelihood functions may be generalised gaussians defined also by a shape parameter. In the present example, the shape parameter is fixed such that the gaussian is a normal distribution, however, different shape parameters will provide varying performance for different image frames and signal samples. Accordingly, it is possible to determine and select the most appropriate shape parameter to provide more accurate likelihood functions. The shape parameter may be determined once for the whole image frame, or preferably may be varied adaptively from one signal sample to the next.

Figure 10:
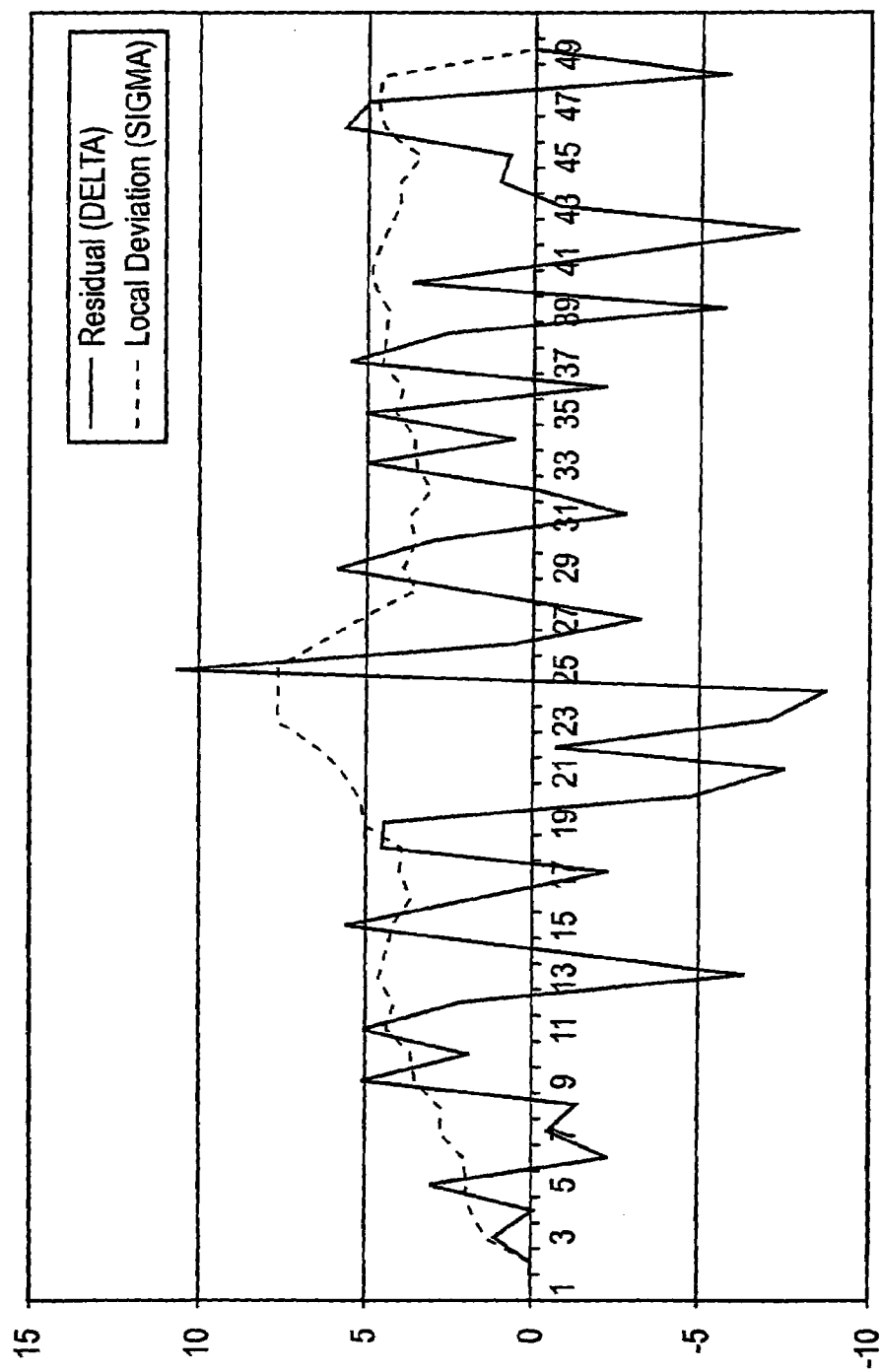
FIG. 10 schematically illustrates the operation of the residual generator and local standard deviation generator of FIG. 8.

The example likelihood functions of FIG. 11 have been generated from sample number 7 from FIGS. 9 and 10. The local mean for sample 7 is approximately 236, and the standard deviation is approximately 3.41. The assumed estimated signal strength is +/−1. Accordingly, the mean of the first likelihood distribution is 236+1=237, and the mean of the second likelihood distribution is 236−1=235. In both cases the standard deviation is 3.41.

The received signal strength for sample 7 is 241. This can be substituted into the likelihood functions to determine the likelihoods of a positive and negative watermark respectively. At the position x=241 on the x-axis of FIG. 11, it can be seen that the likelihood of a positive watermark given a received signal of x=241 is approximately 0.06 and that the likelihood of a negative watermark given a received signal of x=241 is approximately 0.025.

Using Bayes rule, it is possible to link the likelihoods of positive or negative watermarks given a particular received signal value to the probability of the received signal taking the particular value given that the watermark is either positive or negative in the following manner:

$$\frac{p(W+|x)}{p(W-|x)} = \frac{p(x|W+)}{p(x|W-)} \cdot \frac{p(W-)}{p(W+)} \quad (1)$$

Where p(W+|x) is the likelihood of a positive watermark given a particular value of x;
p(W−|x) is the likelihood of a negative watermark given a particular value of x;
p(x|W+) is the probability of a particular value of x given a positive watermark;
p(x|W−) is the probability of a particular value of x given a negative watermark;
p(W−) is the probability of a negative watermark; and
p(W+) is the probability of a positive watermark.

However, if the number of signal samples having a positive watermark is approximately the same as the number of signal samples having a negative watermark, then the ratio between p(W−) and p(W+) will be 1:1 and equation (1) will reduce to:

$$\frac{p(W+|x)}{p(W-|x)} = \frac{p(x|W+)}{p(x|W-)} \quad (2)$$

While the above assumption may not always be true, generally over the course of an image frame it will be reasonable.

In any case, the use of functions defined by this method to detect watermark signals has been found to be effective.

For watermarked images in which all signal samples contain a watermark element, the sum of the probability that a watermark is positive given a particular value of x and the probability that a watermark is negative given a particular value of x is 1. Accordingly:

$$1-p(W+|x)=p(W-|x) \quad (3)$$

Substituting (3) into (2):

$$\frac{p(W+|x)}{1-p(W+|x)} = \frac{p(x|W+)}{p(x|W-)} \quad (4)$$

Rearranging:

$$p(W+|x) = (1-p(W+|x)) \cdot \frac{p(x|W+)}{p(x|W-)} \quad (5)$$

$$p(W+|x) = \frac{P(x|W+)/p(x|W-)}{1+p(x|W+)/p(x|W-)} \quad (6)$$

$$p(W+|x) = \frac{P(x|W+)}{P(x|W+)+p(x|W-)} \quad (7)$$

Accordingly, the probability generator 114, by substituting the likelihoods generated by the likelihood generator 112 into equation (7), can determine the probability of the watermark being positive for that signal sample.

The generation of the first and second likelihood functions is computationally demanding. In a case where a final estimate of watermark strength is not provided immediately upon reception of the image signal at the receiver 102, it is undesirable to wait until receipt of the watermark strength estimate before calculating the likelihood functions. To address this problem, an embodiment of the invention generates the likelihood functions on the basis of an initial estimate. A linear approximation defining a gradient is then generated based on unitary watermark strength. When the revised estimate of watermark strength is provided, the revised watermark strength is multiplied by the linear approximation gradient and a probability of the watermark being positive is determined from the resulting product. The multiplication of the revised watermark strength by a gradient, and any subsequent processing are computationally less demanding and can be calculated more rapidly, increasing the efficiency of the watermark detection method.

It has been found that the ratio of the two likelihood functions varies linearly with respect to watermark strength in the logarithmic domain. Accordingly, the linear approximation can be generated by taking the logarithm of the ratio of the two likelihood functions and then determining its gradient. The gradient can be determined either numerically or analytically. When determining the gradient of the function numerically, the function is evaluated for two different values of watermark strength, and then the gradient of the straight line connecting the two solutions is determined. As described above, the ratio of the two likelihood functions can be used to determine the probability of a positive watermark. When determined analytically, the ratio of the logarithm of the likelihood functions can be differentiated with respect to watermark strength.

Figure 12:
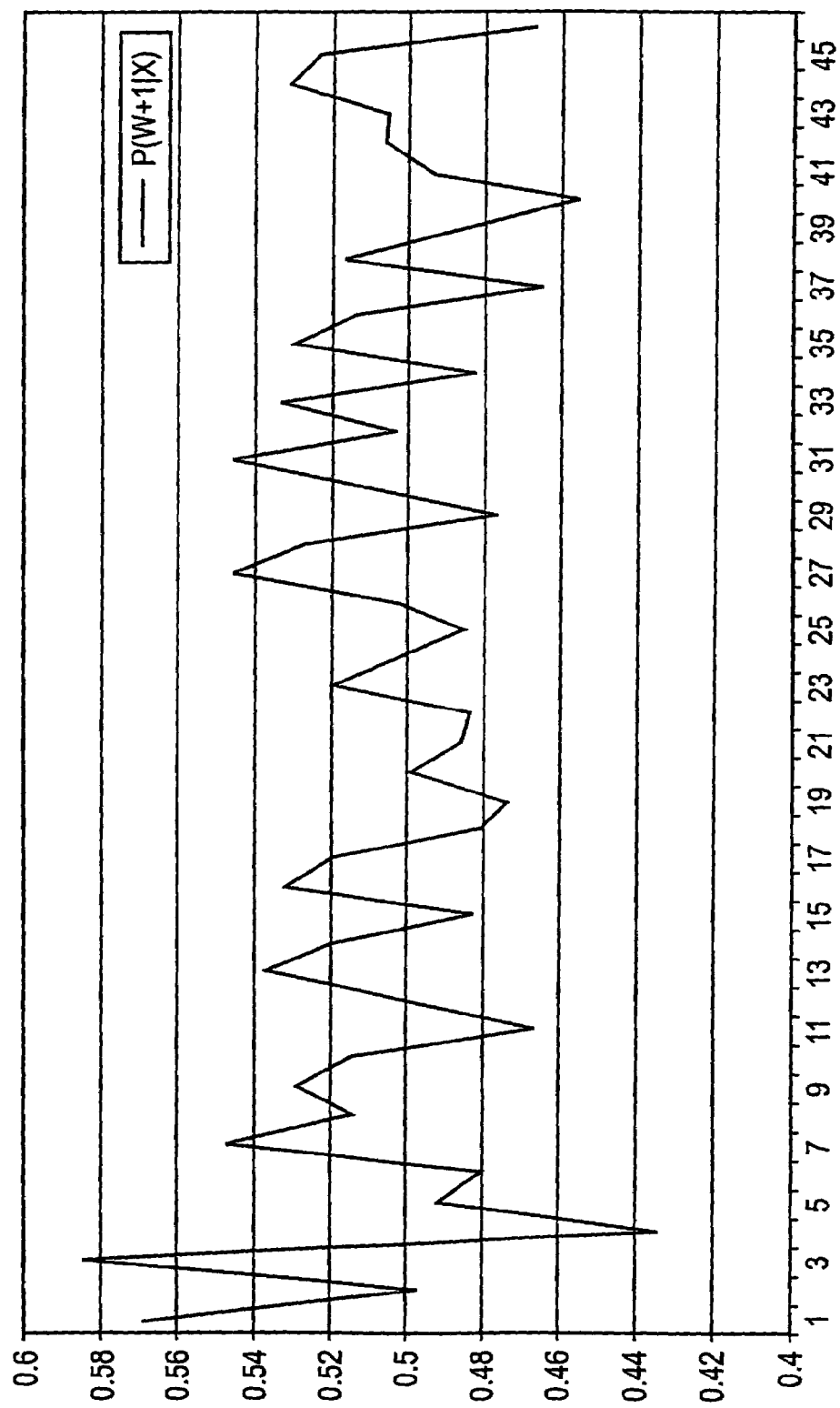
FIG. 12 schematically illustrates the output of the probability generator of FIG. 8.

FIG. 12 schematically illustrates an output of the probability generator 114 corresponding to the received signal of FIG.

8. The output of the probability generator 114 is a signal specifying the probability of the watermark signal being positive for each signal sample within the received signal. Note that because the watermark is known to be present in every signal sample, the probability of the watermark signal being negative for a given signal sample will be directly derivable from the probability of the watermark signal being positive. The probability generated by the probability generator 114 may be generated numerically in a series of steps, or symbolically by executing functions representing one or more equations.

The example data used to generate the graphs of FIGS. 9, 10 and 12, and the formulae used to process the data are described in Annex 1.

Figure 13:
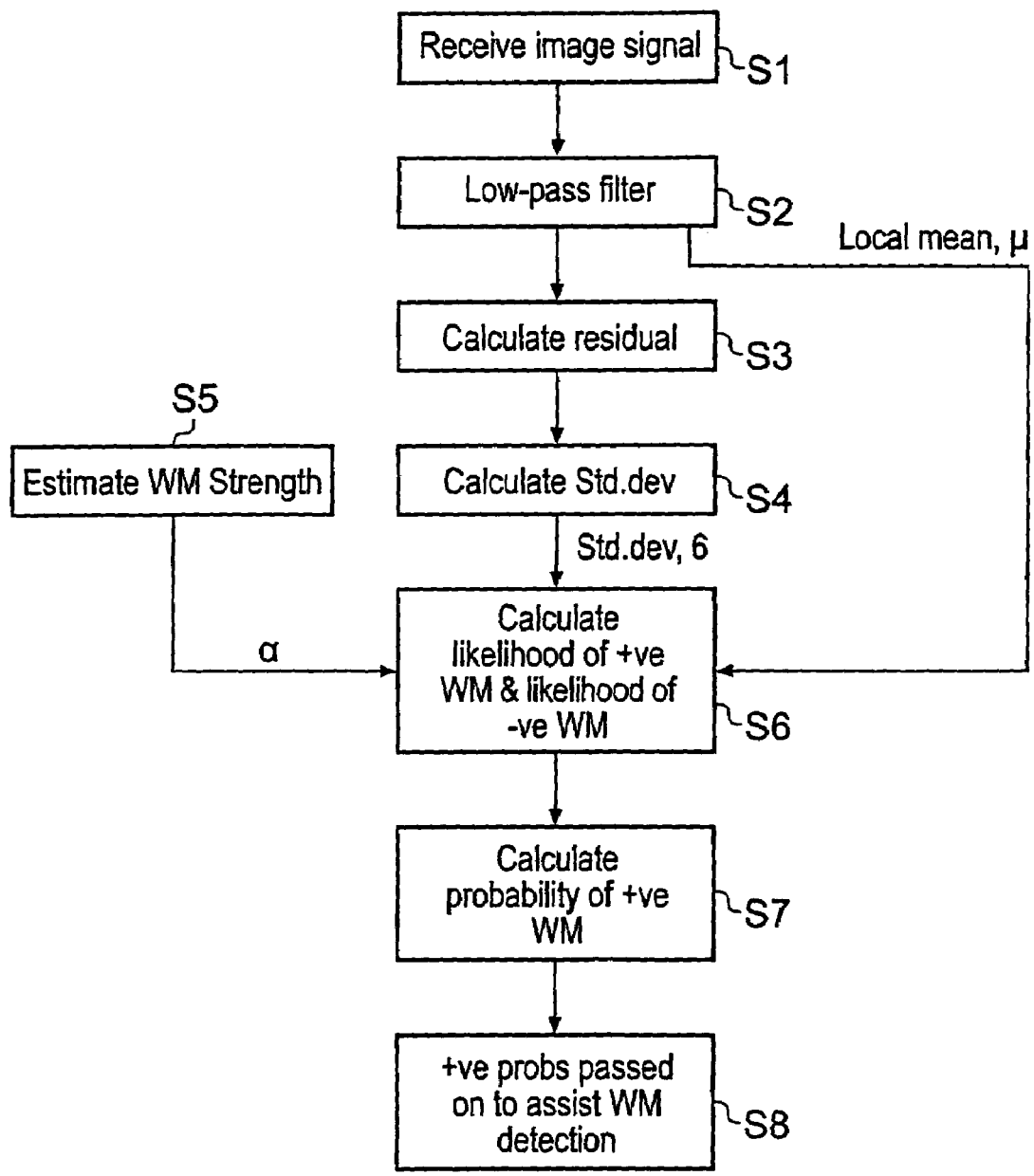
FIG. 13 schematically illustrates a method of generating local watermark probabilities in a received image according to an embodiment of the invention.

FIG. 13 schematically illustrates a method of detecting a watermark in a received image in accordance with an embodiment of the invention. At a step S1, an image signal is received at the local probability calculator 100. At a step S2, the received image signal is low-pass filtered. The low pass filter removes high-frequency changes in the received image signal, thereby de-noising the signal. As described above, generally, the watermark signal will comprise higher frequency components than the original image signal, and therefore the low-pass filtering operation will tend to remove more of the watermark signal than the original image signal. The low-pass filtered signal generated at the step S2 constitutes a local mean for each signal sample of the received image signal. The invention is not limited to a particular type of filter. The term low-pass-filter infers only that high-frequency changes in signal level are attenuated while low frequency changes are substantially preserved.

At a step S3, the low-pass filtered signal is subtracted from the received image signal to generate a residual signal, the residual signal being a first estimate of the watermark signal embedded in the received image signal. It will be appreciated that similar results will be obtainable if the received image signal were to be subtracted from the low-pass-filtered signal. At a step S4, the residual signal is used to generate the standard deviation of the received image signal. Specifically, the residual signal generated at the step S3 is squared, and thereby made positive, and then filtered. The squared and filtered residual signal is defined as the variance of the received image signal. Taking the square root of the squared and filtered signal provides an estimate of the standard deviation. As described above, other methods for determining the standard deviation of the received image signal may also be used.

At a step S5, an initial estimate of watermark signal strength for a particular signal sample is generated. The same watermark signal estimate may or may not be used for each signal sample within the received signal. While it is advantageous for the initial estimate to be as accurate as possible, it will be understood that, in embodiments where a revised watermark strength estimate is to be provided, the actual probability generated for the watermark being positive will be based also on the revised estimate.

At a step S6, the watermark estimator calculates two likelihood functions for the particular signal sample. These are a likelihood function describing the likelihood that the watermark signal added to the particular signal sample is positive, and a likelihood function describing the likelihood that the watermark signal added to the particular signal sample is negative. Each of these likelihood functions is a generalised gaussian function based on the calculated local mean, the calculated standard deviation and the estimated watermark strength. The likelihood functions describe the likelihood of a positive and negative watermark respectively, as a function of the signal sample, x.

At a step S7, the probability that the watermark signal added in respect of a current signal sample is positive is determined from the first and second likelihood functions.

At a step S8, the probability in respect of each image pixel is provided to other components of the decoder to assist the detection of the watermark within the image.

Figure 14:
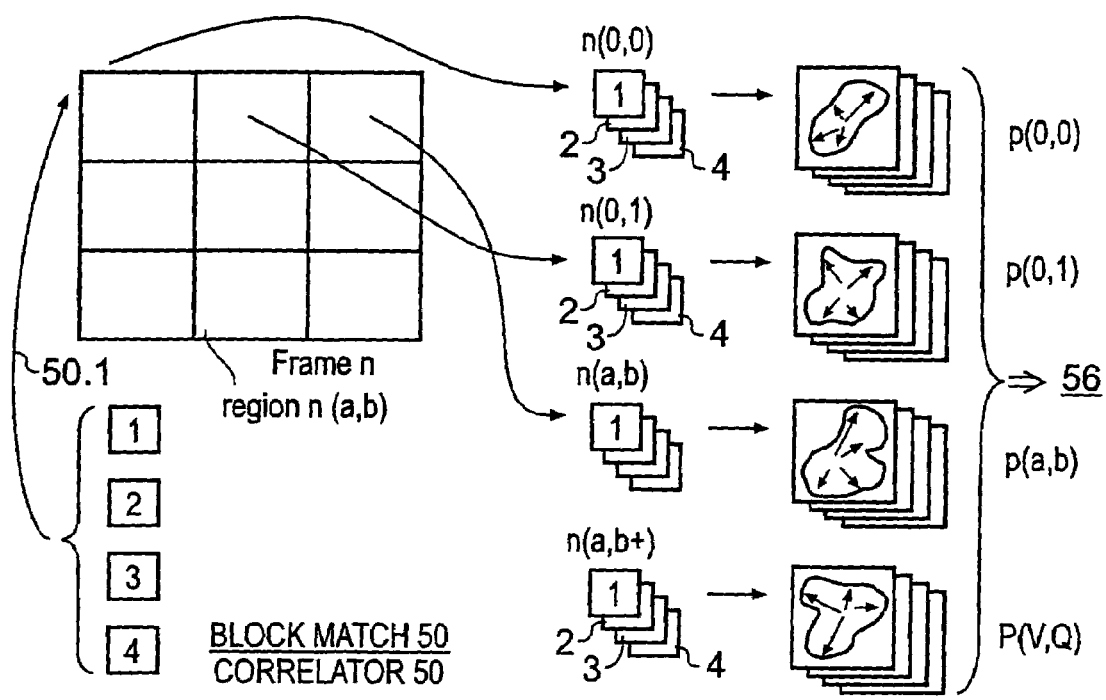
FIG. 14 is a schematic illustration of the operation of a block match calculator which appears in FIG. 7.

Referring again to FIG. 7, the operation of the block match prior probability calculator 50 is illustrated in FIG. 14. As shown in FIG. 14 each of the regions of the water marked image frame is correlated with each of the different water marked blocks of the registration water mark which are reproduced within the block match prior probability calculator 50. This block matching operation uses the local probabilities generated by the local probability generator 100. FIG. 14 provides a conceptual illustration of the effects of processing the water marked image. As illustrated by the arrow 50.1 each of the four water marked registration block values is calculated within a region around the region in which the water marked code word blocks were added by the encoder. As a result of the correlation a probability surface is formed for each of the possible water mark blocks which could have been added to that region. The probability surface provides a two dimensional distribution of distortion vectors identified by the correlation. The correlation of each of the possible water mark blocks is performed for each region so that for each of the four possible blocks for each region there is provided a probability surface representing a likelihood that one of the possible water marked blocks is present.

The term correlation is used to refer to a process in which probability surfaces are formed from the local probability values (or their derivative approximations) and the watermark blocks. A value in a probability surface is calculated from the product of all the probabilities of the pixels in the image region carrying watermark samples of the size and sign indicated by the corresponding positions within the watermark block. This operation can be efficiently implemented for all distortion vectors (positions in the probability surface) at once by taking the log of the probability values (or, more accurately, the log of the derivative) and performing a cross-correlation (or filtering) with the watermark block.

The probability surfaces provided for each possible water marked image block for each region are fed via a channel 56 to a block probability combiner 76. As will be explained shortly, the block probability combiner 76 is arranged to marginalise the block number variable by multiplying each probability surface by corresponding block prior probabilities and adding all probability surfaces per region to give one surface per region. Effectively therefore each of the probability surfaces for each possible water mark block type per region are collapsed to form a single probability surface representing a spatial distortion probability estimate for that image frame. The operation of the distortion probability calculator 76 is illustrated in FIG. 15.

Figure 15:
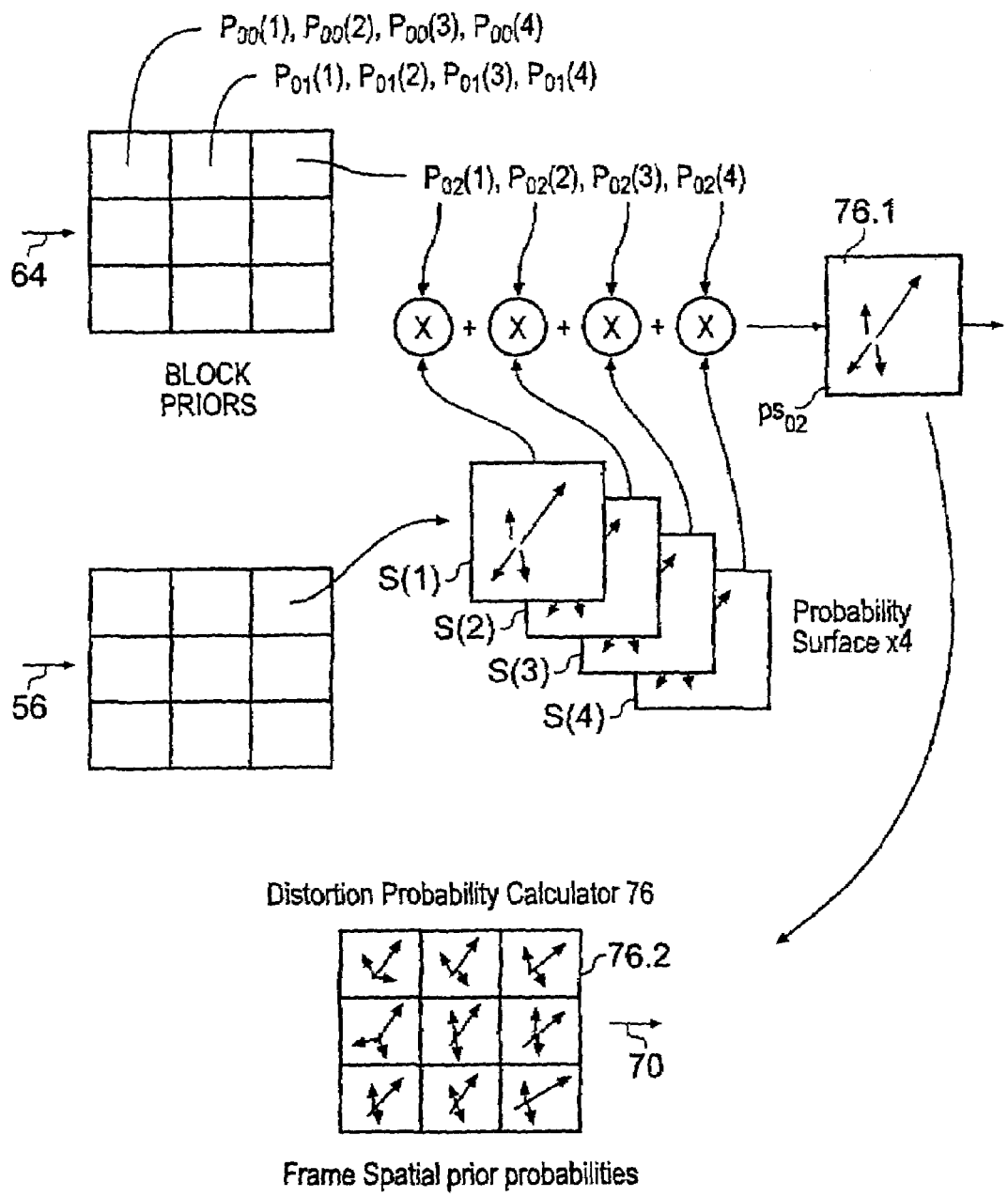
FIG. 15 is a schematic illustration of the operation of a distortion probability calculator, which appears in FIG. 7.

As illustrated in FIG. 15 the distortion probability calculator 76 receives on an input channel 64, block prior probabilities which are used to form a single probability surface for each region of the water marked image frame. The generation of the block prior probabilities will be explained shortly with reference to FIG. 16. However, as shown in FIG. 15 the probability surfaces provided by the block match correlator 50 are multiplied with each of the block prior probabilities which are provided for each region of the water marked image frame. As shown in FIG. 15 for each of the four probability surfaces for each region an effect of forming the dot product with the corresponding block prior probabilities for the corresponding region is to form a single probability surface 76.1. As a result the probability surfaces are combined for each region which provides frame spatial prior probabilities 76.2 providing one probability surface for each region which are output on a conductor 70. The operation of the block prior probability calculator 54 shown in FIG. 7 will now be explained with reference to FIG. 16 providing a conceptual illustrative flow diagram of the operation of the block prior probability calculator 54.

Figure 16:
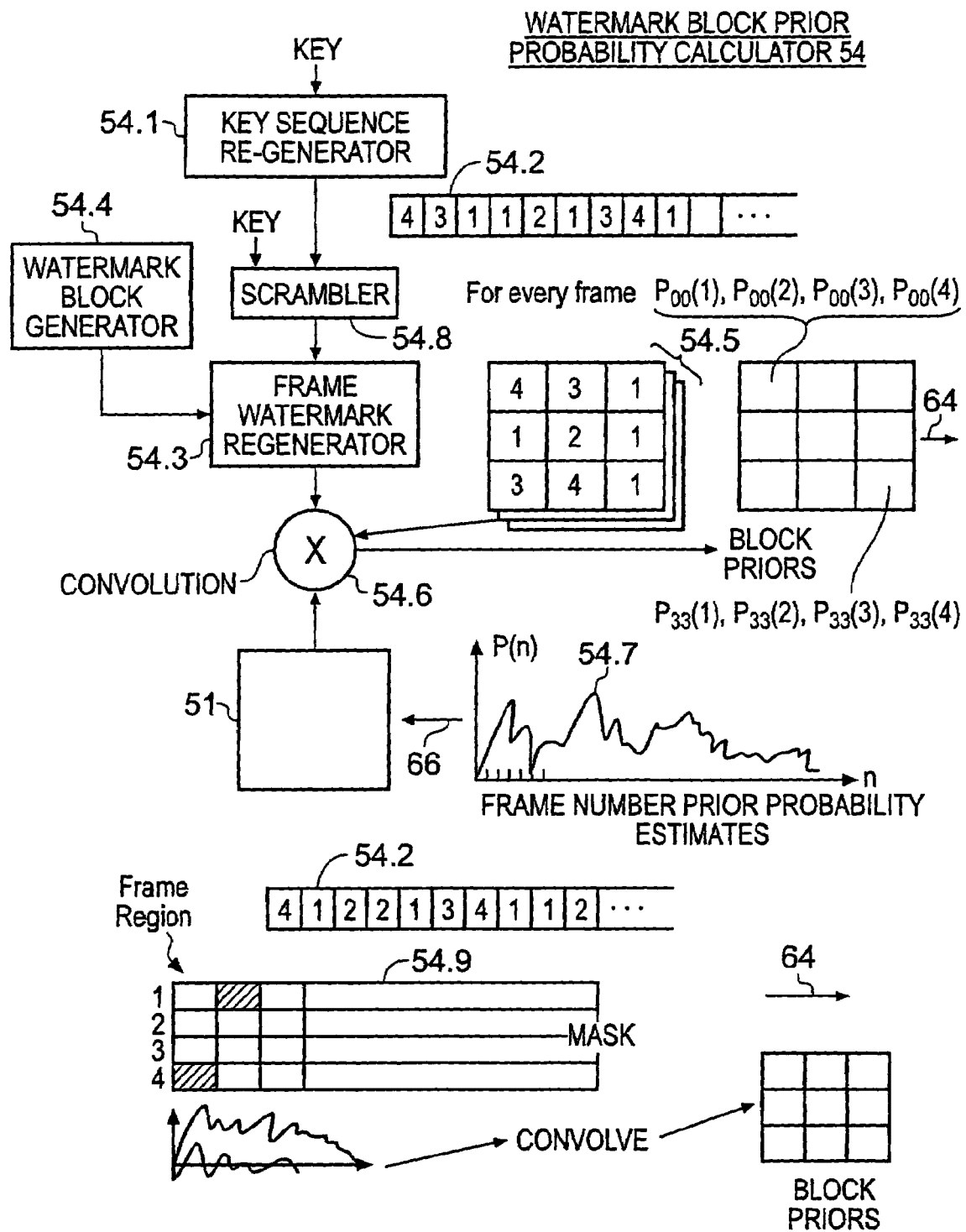
FIG. 16 is a schematic illustration of the operation of a block prior probability calculator, which appears in FIG. 7.

As shown in FIG. 7 the block prior probability calculator 54 receives a frame number prior probabilities estimate from a channel 66 from the frame number priors store 47. The frame number prior probabilities is an accumulated estimate that each frame in the possible sequence of frames is the current frame being processed. As shown in FIG. 16, to generate the block prior probabilities a key sequence generator 54.1 re-generates of long key sequence from which the water mark frames can be formed. The long key sequence is an unscrambled reference sequence for frame 0, for which non cyclic shifts have been made. The key sequence regenerator 54.1 also receives the key which was used in the encoder to generate the long key sequence so that the reference sequence at the decoder is the same as that at the encoder. Accordingly, the long key sequence 54.2 is fed to a frame water mark regenerator 54.3.

The frame water mark generator 54.3 also receives each of the water mark blocks in the set of water mark blocks, the key sequence and the water mark blocks. The decoder does not need the actual watermark patterns for each block in order to calculate the block priors from the frame priors. The water mark patterns are formed by selecting the blocks in accordance with the index provided within the key sequence thereby reproducing the water mark frame patterns for each frame in the sequence of frame. The decoder therefore uses the frame priors and the keyed reference sequence.

At this point the decoder is unaware of which of the sequence of frames the current frame corresponds. However, the decoder maintains a running estimate of the probability that the current frame is that frame within the sequence which is the frame number prior probabilities maintained within the data store 47. These are fed via the channel 66 to the block prior probability calculator 54. The frame number prior probabilities are then fed to a second input of a convolution processor 54.6 which also receives the water marked frame patterns 54.5. The convolution processor 54.6 then forms the block prior probabilities from the unscrambled reference sequence and the frame prior probabilities.

The block prior probabilities comprise for each region within the current frame a probability of each of the possible water mark blocks in the set of water mark blocks being present within that region. Thus as shown by the illustration of the current water mark frame 54.7 each region comprises a probability Pab(n) where a is the row index and b is the column index and n is the index from 1 to 4 of the possible water mark blocks.

At the bottom of FIG. 16 an illustration is presented of an efficient way of calculating the block prior probabilities from the key sequence 54.2 and the frame number prior probabilities. This is done by convolving the frame number prior probabilities with a reference mask 54.9 which represents the presence or absence of a particular water mark block within each regenerated water mark frame pattern. The block prior probabilities can be calculated efficiently by convolving the reference mask 54.9 with the frame number prior probabilities, to produce the block prior probabilities. This is because the reference mask 54.9 provides for each column the corresponding region within the water marked pattern and within each column a probability value of 1 against the particular water mark block which should be present within that region for that frame in a predetermined sequence. All other regions in the column are set to zero.

Figure 17:
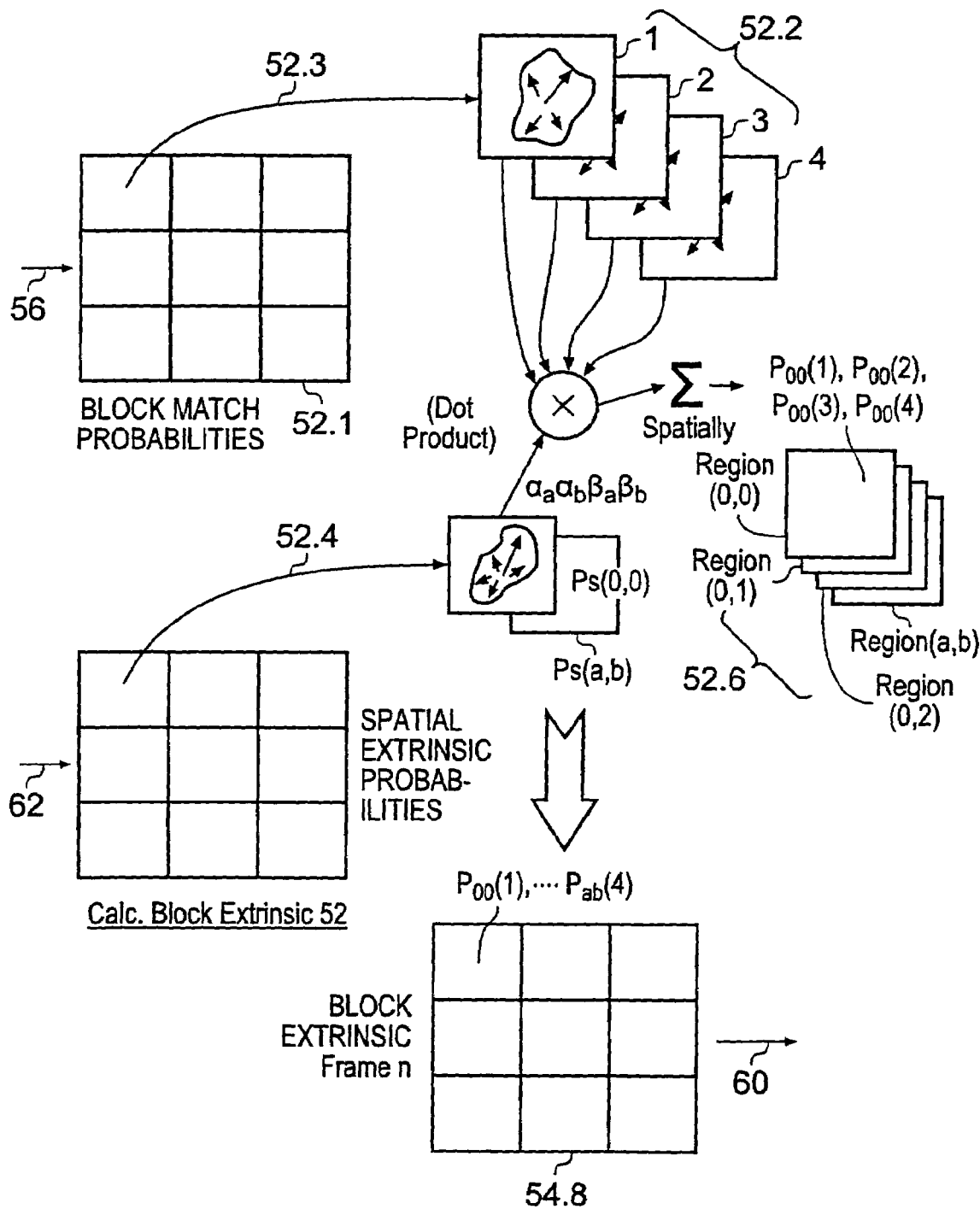
FIG. 17 is a schematic illustration of the operation of a block extrinsic probability calculator, which appears in FIG. 7.

Returning to FIG. 7 the block match probabilities fed on channel 56 are also received by a block extrinsic calculator 52. The block extrinsic calculator 52 is shown in more detail in FIG. 17. As shown in FIG. 17 the block match probabilities are received on the channel 56 and as illustrated in FIG. 14 provide for each region of the current water marked image frame four probability surfaces, one for each possible water mark block which could be present in that region. Thus as illustrated in FIG. 17 by an arrow 52.1 with respect to the first region in column=0 row=0, four probability surfaces 52.2 are provided and correspondingly each region will provide four probability surfaces. The block extrinsic calculator 52 also receives on a channel 62 for the current frame a set of spatial extrinsic probabilities which are derived from the spatial frame prior probabilities generated on the conductor 70 by the distortion probability calculator 76. The generation of the spatial extrinsic probabilities from the frame spatial prior probability will be explained shortly. As illustrated in FIG. 17 the spatial extrinsic probabilities provide for each region of the water mark frame a probability surface representing a two dimensional distribution of distortion vectors for that region. Thus the probability surface provides a possible distribution of distortion within that region. Thus as shown with the arrow 52.4 the first region in column=0 row=zero provides a single probability surface (ps(0,0) and correspondingly each region will provide a corresponding probability surface.

The block extrinsic calculator 52 is arranged to generate for each region of the water mark frame a probability of that value for each of the four possible water mark blocks. The probability value for each water mark block for each region a likelihood that that region contained the water mark block index number from the set of possible water mark blocks in the current image frame. These are the block extrinsic probabilities. The block extrinsic probabilities are calculated by forming a dot product between the probability surface provided for each region by the spatial extrinsic probabilities and the probability surface for each possible water mark block for each region. The dot product is calculated by doing a point by point multiplication and sum to form a single probability value for each possible water mark block. Thus the block extrinsic probabilities are represented as probability values 52.6 for each region which may also be represented for the current frame with respect to the corresponding region by a frame of block extrinsic probabilities 54.8. The block extrinsic probabilities are then output on a channel 60 as shown in FIG. 7 to a frame number extrinsic probability calculator 90. The frame number extrinsic probability calculator 90 is shown in more detail in FIG. 18.

Figure 18:
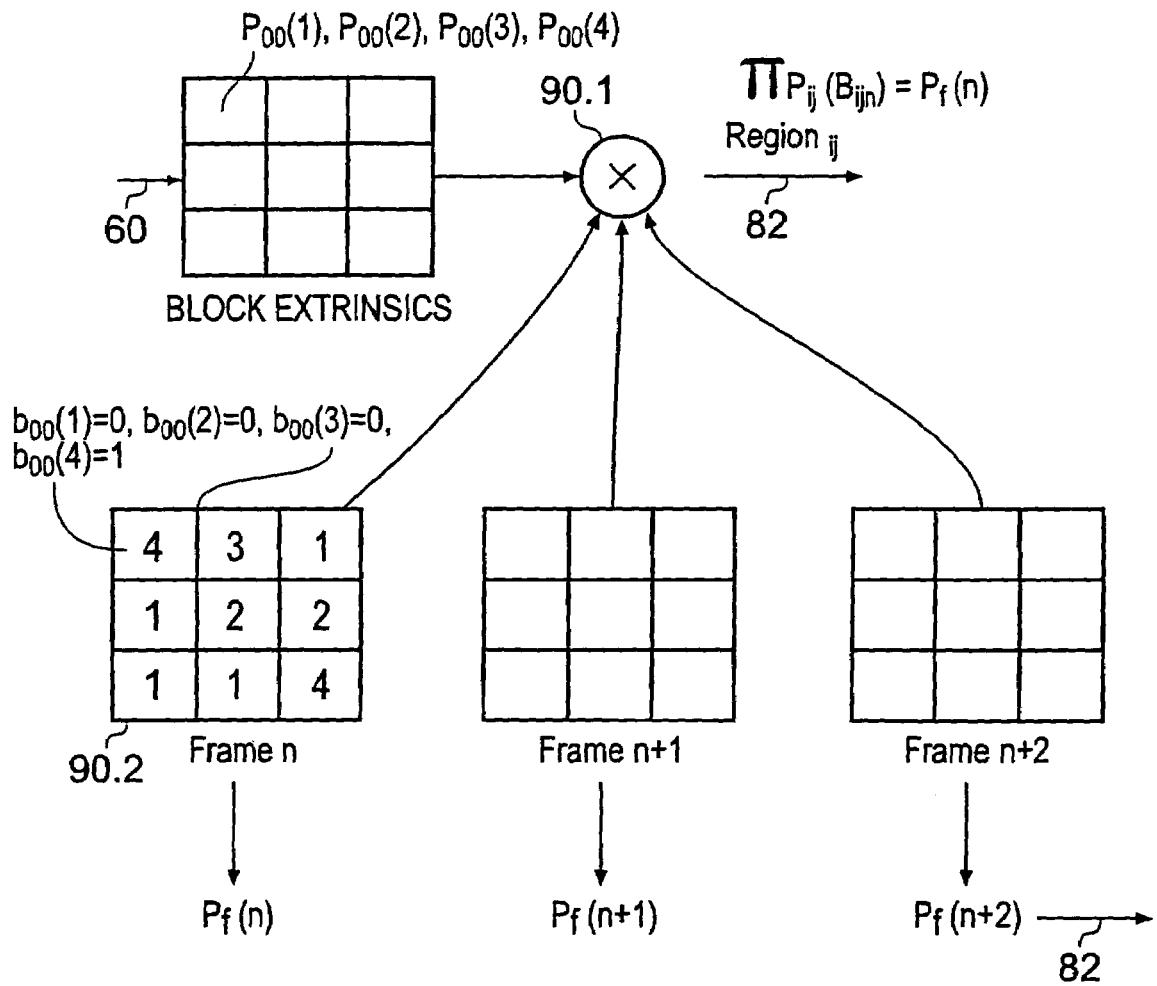
FIG. 18 is a schematic illustration of the operation of a frame number extrinsic calculator, which appears in FIG. 7.
Figure 18:
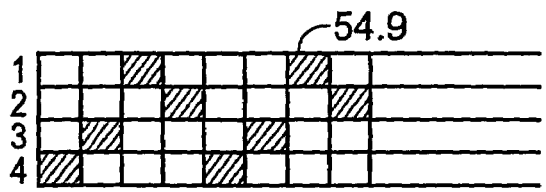

In FIG. 18 the block extrinsic probabilities are received via channel 60 to one input of a correlating processor 90.1. On another input to the correlating processor 90.1 presence probability values are provided which represent for each frame in the sequence of frames a probability that one of the blocks in the set of blocks is present within a region within that frame. Thus within the frame number extrinsic probability calculator 90 corresponding elements shown in FIG. 15 are provided to generate for each frame the water mark frame pattern. Thus a key sequence regenerator, a scrambler, a water mark block generator and a frame water mark regenerator will also be present to generate a sequence of water mark frames in the predetermined sequence from which the presence probabilities are derived. Thus for example for frame n 90.2 each region will have one of the four possible water mark blocks. Thus as illustrated for the region in column=0 row=0, for frame n water mark block 4 is present, the value of the probability for water mark 4 will be 1 whereas the probability for other water mark blocks will be zero. Thus for each frame corresponding presence probabilities are produced for each region. The presence probabilities are multiplied with the block extrinsic probabilities to provide for each frame a probability that the current frame is that frame in the sequence. Thus as shown in FIG. 18 for frame n the frame number extrinsic probability is formed by multiplying the presence probability by the corresponding block extrinsic probability. This effectively selects the block extrinsic probability for the water mark block which is present for that region and multiplies each of the selected block extrinsic probabilities together to form the probability that the current frame is that frame in the sequence.

As illustrated in the bottom of FIG. 18 a more efficient technique for calculating the frame extrinsic probabilities is illustrated. As shown in FIG. 18, the frame extrinsic probabilities can be calculated efficiently by taking the log of the block extrinsic probabilities and correlating these with the reference mask 54.9 for the key sequence which is generated by the same arrangement shown in FIG. 15. Each of the block extrinsic probabilities selected by the reference mask 54.2 are added to form the log of the probabilities of that frame so that by taking the exponent the frame number extrinsic probability for that frame is generated, in a computationally efficient way. Thus the output of the frame extrinsic probability calculator 90 on the channel 82 the current estimate of the frame number probabilities is formed, that is to say the current guess that the current frame has a certain probability of being that frame within the predetermined sequence of frames. The frame extrinsic probabilities are then fed to a frame number posteriori probability calculator 84.

Figure 19:
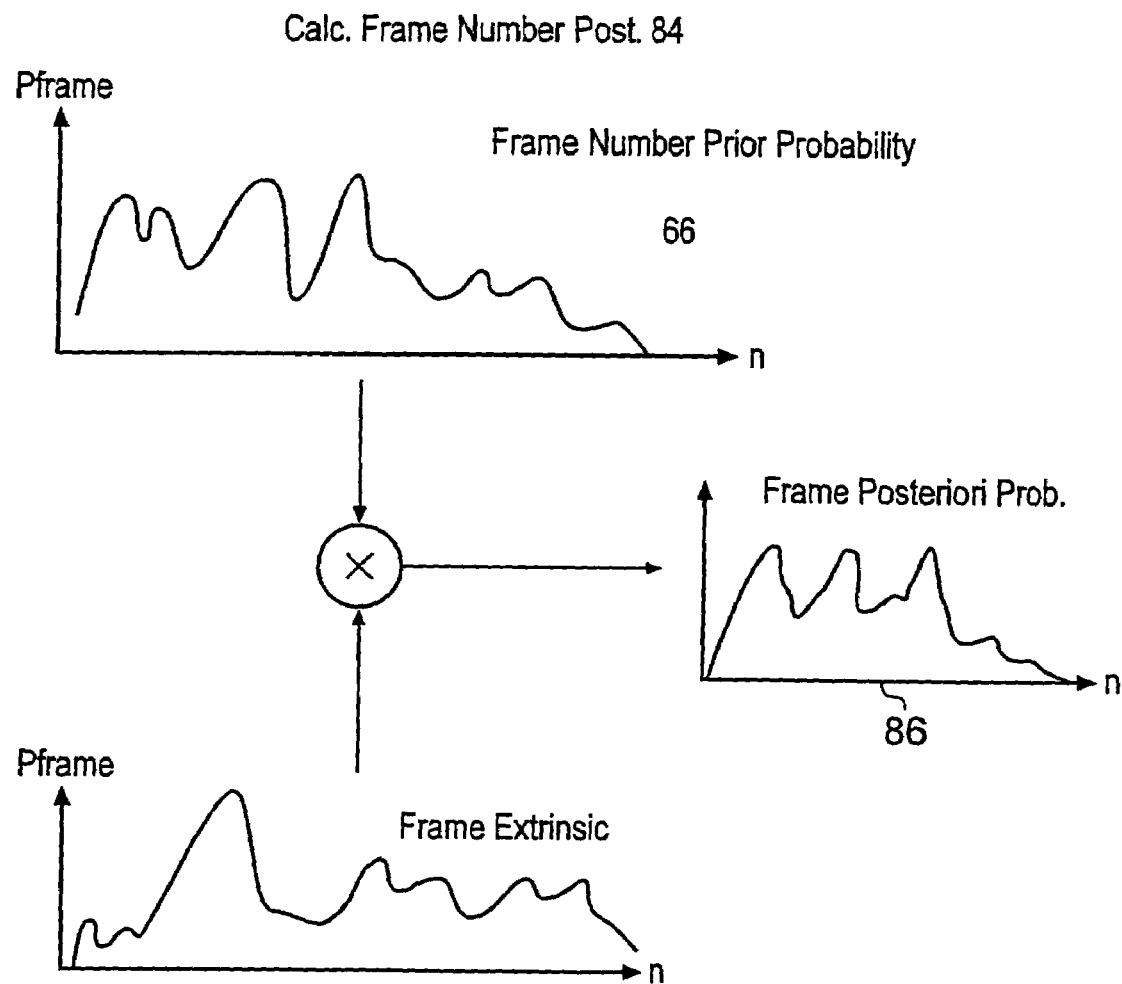
FIG. 19 is a schematic illustration of the operation of a frame posteriori probability calculator which appears in FIG. 7.

The frame number posteriori probability calculator 84 in combination with the next frame number prior probability calculator 87 serve to generate the next frame number prior probabilities which are stored in the data store 48. The next frame number prior probabilities are then forwarded to the next frame prior probability store 47 for a next iteration of the decoder. The operation of the frame number posteriori probability calculator 84 and the next frame prior probability calculator 87 are illustrated in FIG. 19.

Figure 20:
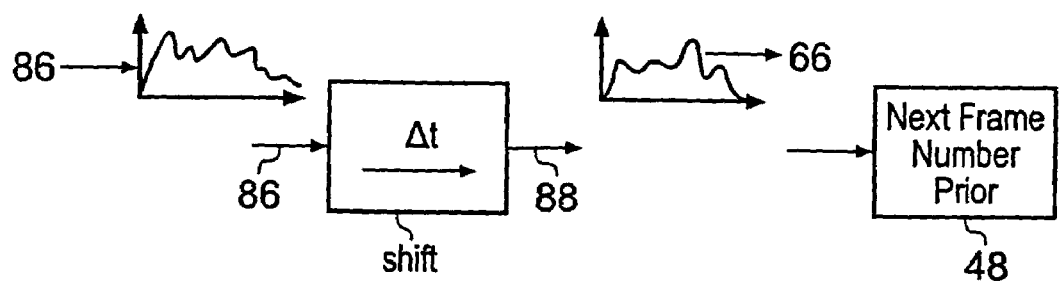
FIG. 20 is a schematic illustration of the operation of a next frame spatial alpha calculator, which appears in FIG. 7.

The frame number posteriori probability calculator 84 and the next frame number prior probability calculator 87 operate in a relatively simple way by multiplying the current frame number extrinsic probabilities produced by the frame number extrinsic probability calculator 90 with the frame number prior probabilities fed received on the channel 66 to produce the frame posteriori probabilities. These are output on a channel 86. Thus as illustrated in FIG. 19 point by point multiplication is performed by a multiplier, multiplying the value for frame n in the frame extrinsic probabilities with the value for frame n for the prior probabilities to produce the value for frame n of the frame number posteriori probability. In order to produce the frame number prior probabilities for the next frame the frame posteriori probabilities received on the channel 86 are simply shifted by one frame cyclically to reflect the form of the probabilities which should correspond to the next frame processed by the decoder. Thus as illustrated in FIG. 20, the frame posteriori probabilities are received on connector 86 shifted by one place by a probability shifting processor 87.1 to produce the next frame number prior probabilities output on the connector 88 to the next frame number prior probabilities store 48. As illustrated in FIG. 7 for the next frame the next frame number prior probabilities are shifted and stored in the frame number prior probability store 47 via a channel 89.

As shown in FIG. 7 the frame spatial prior probabilities 70 are fed to a spatial prior probability generator 71 which generates spatial prior probabilities for use in estimating the distortion in each region of the current water marked image frame. The operation of the spatial prior probability generator 71 is illustrated in FIG. 21.

Figure 21:
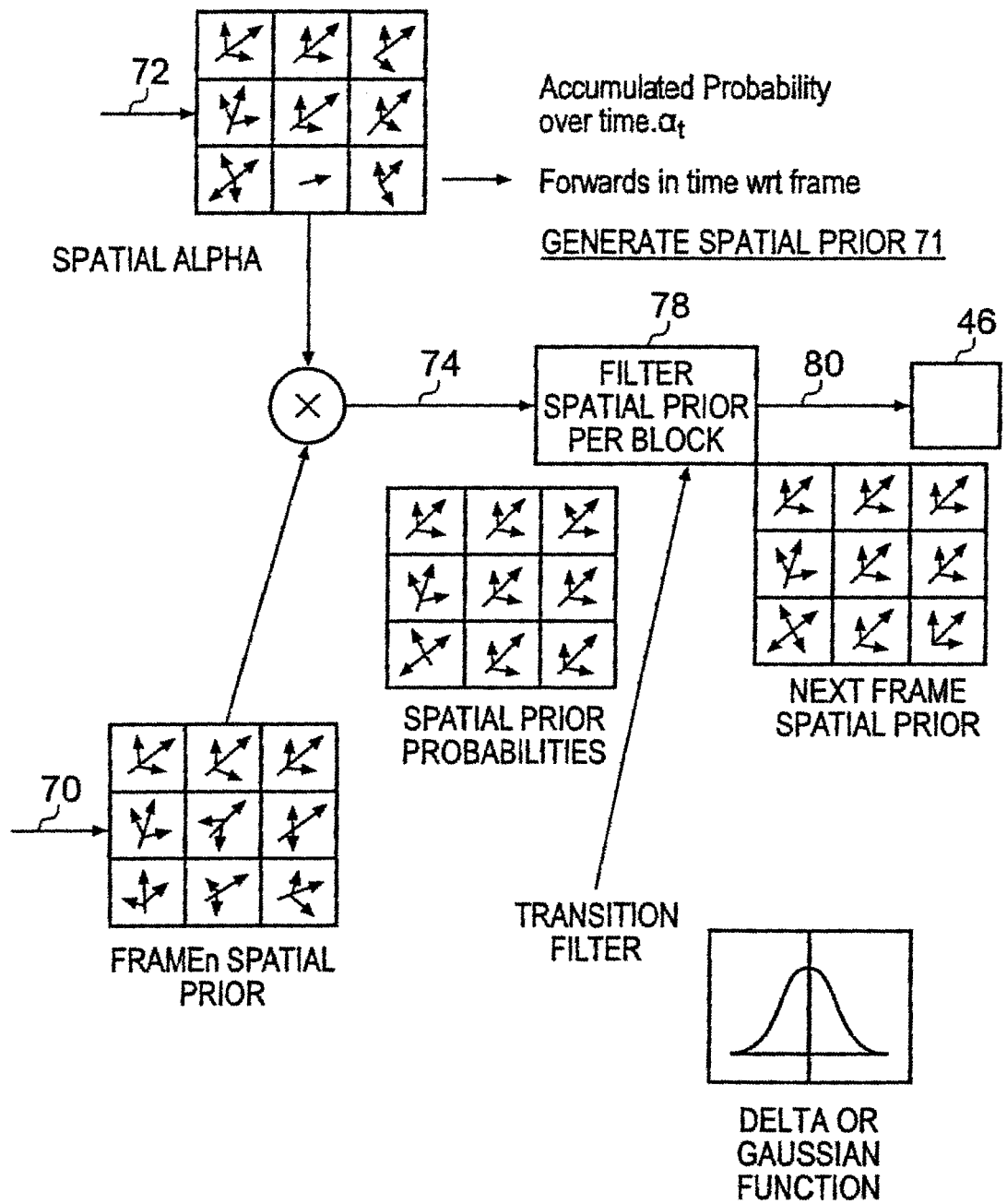
FIG. 21 is a schematic illustration of the operation of a spatial prior probabilities calculator which appears in FIG. 7.

In FIG. 21 as shown in FIG. 7 the spatial prior probability generator receives via a channel 72 an accumulated estimate of the spatial prior probabilities from the data store 45 shown in FIGS. 6 and 7. The accumulated spatial prior probabilities are referred to as spatial alpha t and represent an accumulated estimate of the probability surface for each region, which is accumulated over each of the water marked frames which is processed. Thus, the current spatial prior probability, which is generated, depends on the spatial prior probabilities generated for all previous frames in the sequence of frames.

As mentioned above the spatial prior probability generator receives on the channel 70 the frame spatial prior probabilities from the distortion probability calculator 76. In order to produce the spatial prior probabilities the spatial prior probability calculator 71 performs a point by point multiplication of two probability surfaces for each region. One probability surface is the spatial prior probability for each region and the other is the spatial alpha t probability surface for the corresponding region to perform the spatial prior probabilities which comprise for each region a probability surface.

The spatial prior probabilities output on a channel 74 are filtered with a spatial prior probability filter 78 to produce the next frame spatial alpha t. The filtered spatial prior probabilities are output on the channel 80 and stored in the data store 46. Thus the filter 78 forms a transition filter which filters the new probabilities with respect to a likelihood of things occurring that is, how the distortion is expected to vary over time. Likely functions for the filter are a delta function or a gaussian function.

The next frame spatial alpha probabilities are fed from the output data store 46 to the input data store 45 via a channel 91 ready for the next frame to be processed.

Referring back to FIG. 7 the spatial prior probabilities 74 are received by a markov distortion processor 58 which is arranged to generate spatial posteriori probabilities from the spatial prior probabilities and spatial extrinsic probabilities which are generated in calculating the spatial posteriori probabilities. The markov distortion processor 58 and the spatial posteriori probability generator 92 are shown in more detail in FIG. 22.

Figure 22:
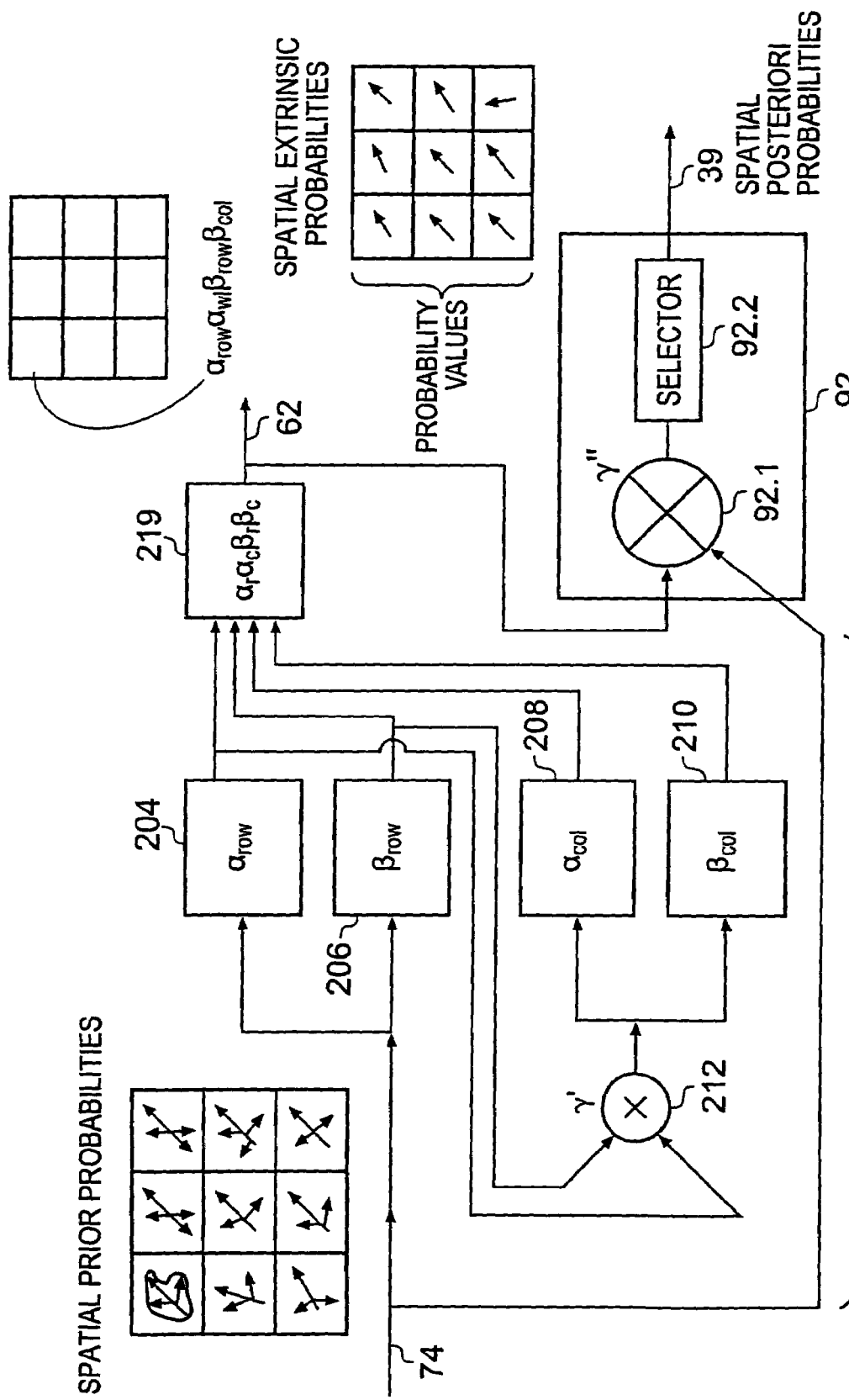
FIG. 22 is a schematic illustration of the operation of a markov distortion processor which appears in FIG. 7.

In FIG. 22 the spatial prior probabilities, which comprise a probability surface for each region are received via channel 74 by a forward probability processor 204 and a backward probability processor 206 which process the spatial prior probabilities row-wise. The forward probability processor 204 is arranged to refine each probability within the probability surface for each region with respect to corresponding probabilities within all other rows for each column. As a result the spatial prior probabilities are refined independence upon all other probability surfaces in that row. Correspondingly, the backward probability processor refines the probabilities within the probability surface for each row but with respect to each probability surface from a corresponding region going backwards along each row. An output of the forward and backward probability processors 204, 206 is past to an extrinsic probability calculator 219 and a combiner 212. The combiner 212 performs a multiplication of the spatial prior probabilities refined by the forwards probability processor 204 and the spatial prior probabilities refined by the backwards probability processor 206 with the spatial probabilities to form further refined spatial prior probabilities. The further refined spatial prior probabilities are forwarded to a second forward probability processor 208 and a second backward probability processor 210. The second forward and backward probability processors 208 210 operate in a corresponding way to the first forward a backward probability processors 204 206 except that the second forward and backward probability processors 208 210 process the spatial prior probabilities column-wise. That is to say the forward probability processor 208 refines each of the probability surfaces for the spatial prior probabilities by adapting each probability with respect to the corresponding probabilities for all previous regions in each columns. Likewise the backward probability processor 210 refines each of the probability surfaces moving backwards down each column.

After the spatial probabilities have been processed by the second forward and backward probability processes 208 210, the refined spatial prior probabilities are fed to the spatial extrinsic probability calculator 219. The spatial extrinsic probability calculator 219 multiplies each of the refined versions of the spatial prior probabilities for form on an output conductor 62 spatial extrinsic probabilities for each region. The spatial extrinsic probabilities are then used by the block extrinsic calculator 52 as explained with reference to FIG. 17. The spatial extrinsic probabilities from channel 62 are also passed to the spatial posteriori probability calculator 92. The spatial extrinsic probabilities are received by a multiplier 92.1 and are multiplied with the original spatial prior probabilities to form a combined probability surface for each region. A buffer 92.2 then stores the distortion vectors for each region from the probability surface formed by the multiplier 92.1 to produce the spatial posteriori probability distributions for each region which are output on connector 39. The spatial posteriori probabilities are the best guess of the distortion for each region for the current iteration for the current frame of the processed video sequence. A more detailed explanation of the operation of the markov distortion processor shown in FIG. 22 is provided in annex 2.

Figure 23:
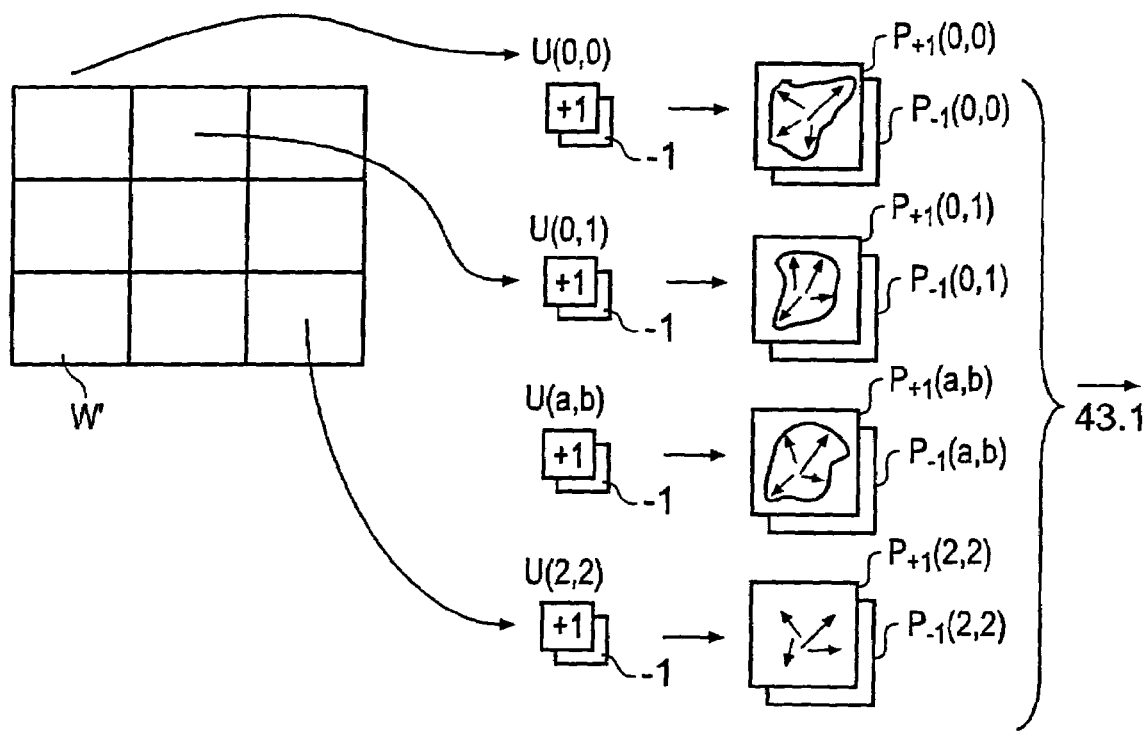
FIG. 23 is a schematic illustration of the operation of a block match prior probabilities calculator which appears in FIG. 6.

Returning to FIG. 6 an explanation of the operation of the detection of the payload data will now be explained with reference to FIGS. 23 and 18.

As shown in FIG. 6 the received water mark image frames are passed to a block match probability processor 43. As for the block match prior probability calculator 50 which appears in FIG. 7, the two dimensional payload blocks produced by the payload block generator 44 are correlated with each region of the water marked image frame which is illustrated by FIG. 23. Thus as shown in FIG. 23 the water mark image frame for the current frame is correlated with respect to the positive water marked block and the negative water mark block to produce for each region a probability surface for the positive water mark in that region and a negative water mark in that region. Each of these probability surfaces is then forwarded to the block probability calculator 40 via the connecting channel 43.1. The operation of the block probability calculator 40 is illustrated in FIG. 24.

Figure 24:
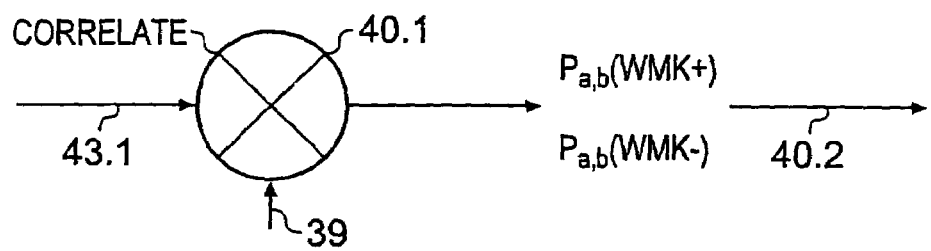
FIG. 24 is a schematic illustration of the operation of a spatial posteriori probabilities calculator which appears in FIG. 6.
Figure 24:
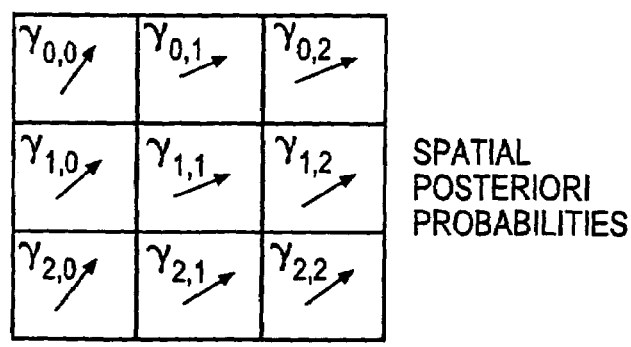

In FIG. 24 the spatial posteriori probabilities are received via the connecting channel 39 by a combiner 40.1 and the block match prior probabilities are received from the connecting channel 43.1 by a second input of the combiner 40.1. The block prior probabilities calculator 40 operates in a corresponding way to the distortion of probability calculator 76 except that the block probabilities calculator 40 marginalises the spatial posteriori probabilities with the probability surface for each of the positive or negative water marked blocks for each region to obtain a spatial probability distribution for each block and region. This is done by multiplying the probability and adding for each probability value within the surface to produce for each region a probability that that region contains a positive watermark and that region contains a negative water mark. These probability values are then unscrambled by an unscrambling processor using a scrambling key known from the encoder and forwarded to a soft error correction decoder.

The soft error correction decoder 42 operates to perform a soft decision decoding process using the positive probability values and the negative probability values for each region to recover the payload data work. As those familiar with error correction coding will appreciate soft decision decoding provides a considerable advantage in terms of correcting errors in a payload with respect to a signal to noise ratio available for detecting that payload. An advantage is provided by the present technique in that by maintaining likelihood values for the probabilities of the positive and negative values in each region throughout the detection and decoding process, soft decision decoding can be used to recover the payload data word more accurately. The payload data word is therefore output on a conductor 42.1.

Annex 1: Example Local Probability Calculation

FIG. 27 and FIGS. 28A to 28C schematically illustrate tables containing the example data and formulae used to generate the graphs of FIGS. 9, 10 and 12. Specifically, the table of FIG. 27 contains the example data and the results of the intermediate and final calculations made to generate a final probability of a positive watermark for each of the received signal samples. Each row in the table corresponds to a received signal sample.

Column A defines the filter used in the generation of a local mean and a local standard deviation.

Column B defines the original image (note that these values are not known to the decoder).

Column C defines the strength and polarity of a watermark added to the original image (note that these values are not known to the decoder).

Column E defines the received image to undergo watermark detection.

Column G is the local mean signal.

Column H is the residual signal.

Column I is the squared residual signal.

Column J is the local standard deviation.

Columns L and M are the calculated likelihoods (of a positive and negative watermark respectively).

Columns N and O are the results of intermediate calculations used in generating the probability of the watermark being positive.

Column P is the calculated probability of the watermark being positive, given the received signal value.

Figure 27:
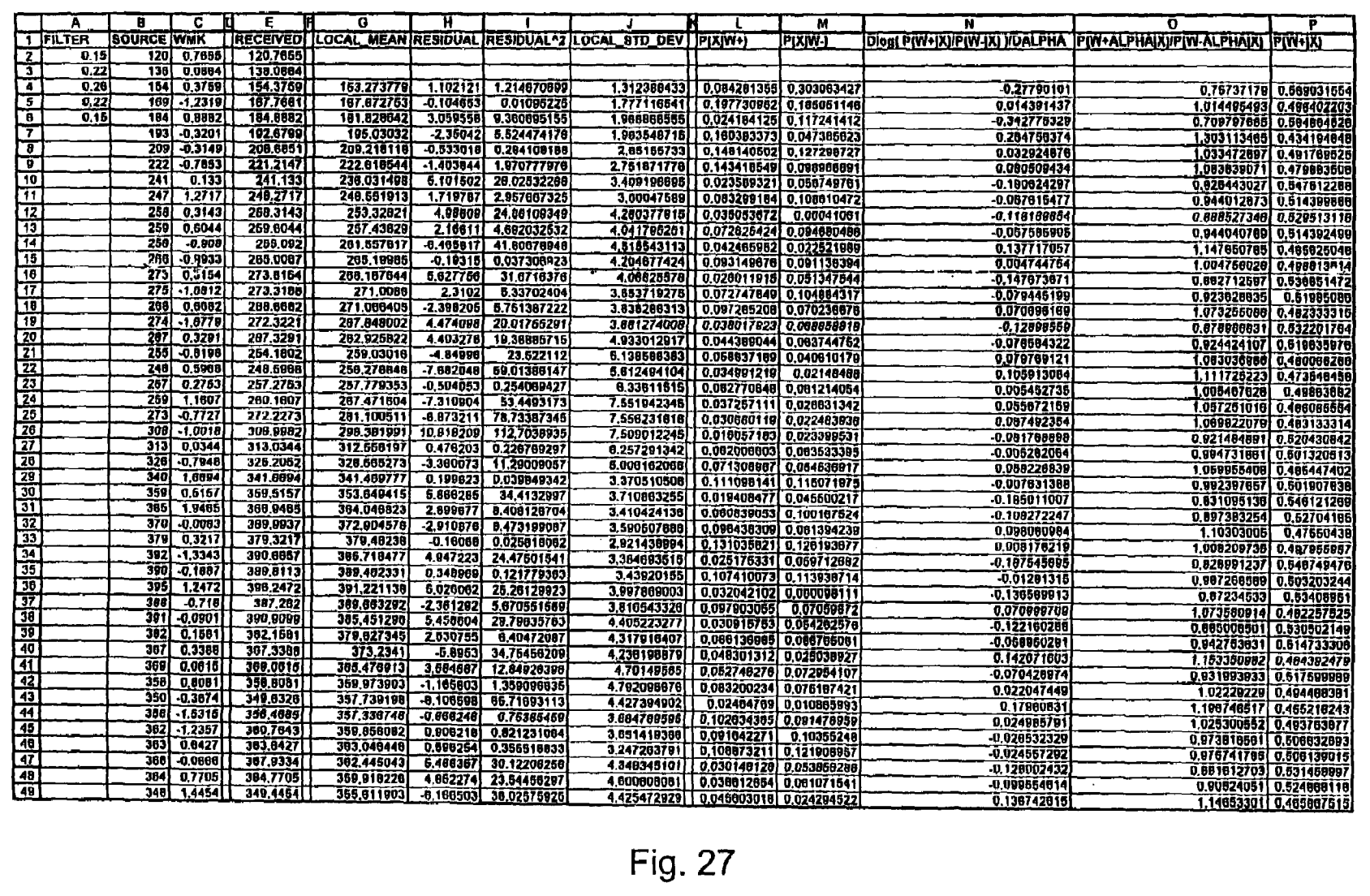

The Tables of FIGS. 28A to 28C contain the formula used to generate the values of FIG. 27. The line and column labelling of FIGS. 28A to 28C correspond to the line and column labelling of FIG. 27.

Annex 2: Markov Distortion Processor

A more detailed illustration of the markov distortion processor illustrated in FIGS. 7 and 22 will now be provided. The spatial prior probabilities for each image block in a row b and a column n, provide an observed probability distribution of distortion vectors $\gamma_{b,n}$. The observed probability distribution of distortion vectors for each block represents a likelihood of possible shifts of the image block within the water marked image frame with respect to a position of the block in the original version of the image. The observed probability distribution of distortion vectors $\gamma_{b,n}$ are then processed by a forward probability estimator 204 and a backward probability estimator 206.

As will be explained the distortion vectors are processed according to a predetermined pattern to the effect of calculating for each image block a forward probability distribution estimate of possible distortion vectors and a backward probability distribution estimate of possible distortion vectors depending upon previous and subsequent estimates of the forward and backward probability estimates respectively. For the example embodiment illustrated in FIG. 22, the predetermined pattern is such that the image blocks are processed in rows and subsequently processed as columns. Thus a two-pass estimate performed with the effect that a probability of distortion vectors in each image block is determined after processing the image blocks in rows and then refined probability distortion vectors are formed after processing the image blocks in columns. However in other embodiments, other predetermined patterns may be used and only a single pass may be used to generate the most likely distortion vector for each block.

The observed distortion vectors $\gamma_{b,n}$ for the image blocks are then communicated to a forward probability estimator 204 and a backward probability estimator 206. As will be explained in more detail in the following paragraphs, the forward probability estimator generates a probability distribution estimate of possible distortion vectors within each of the image blocks. The forward probability distribution estimates are calculated from previously calculated probability estimates from image blocks, which have already been calculated for previous image blocks in each row, moving forward along the row. For each block in the row, the observed distortion vector $\gamma_{b,n}$ calculated by the distortion vector estimator is combined with the currently determined forward probability estimate which has been calculated from previous image blocks moving along the row. The forward probability estimates are therefore calculated recursively from previous blocks in the row. This can perhaps be better understood from the diagram in FIG. 25.

Figure 25:
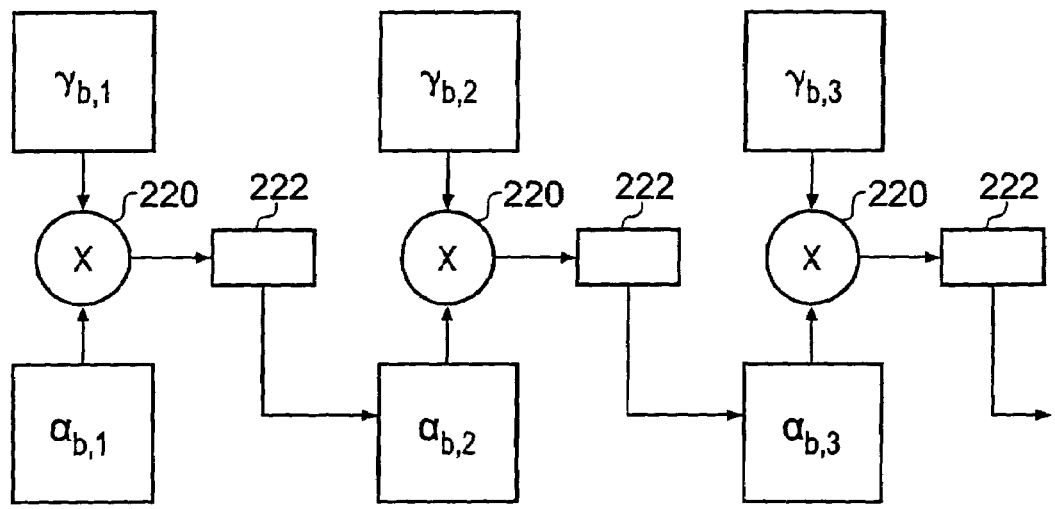
FIG. 25 is a schematic block diagram of a forward probability estimator as shown in FIG. 22.

FIG. 25 provides a schematic illustration of an example operation of the forward probability estimator 204, in which the first three forward probability distortion vectors are calculated recursively for the first three image blocks. As illustrated the forward probability estimates $\alpha_{b,1}$, $\alpha_{b,2}$ and $\alpha_{b,3}$ are calculated from corresponding distortion vector estimates determined for the first three blocks in a row b of the image $\gamma_{b,1}$, $\gamma_{b,2}$ and $\gamma_{b,3}$. As shown in FIG. 24, each of the forward probability estimates is calculated recursively from the probability estimate from the previous image block in the row. Thus for example, the forward probability estimate for the second image block $\alpha_{b,2}$ is calculated by a multiplier 220 multiplying the distortion vector estimate $\gamma_{b,1}$ for the first image block with an estimate of the forward probability $\alpha_{b,1}$ for the first image block. Thereafter the subsequent forward probability estimate $\alpha_{b,n}$ is determined by multiplying the forward probability estimate $\alpha_{b,n-1}$ and the distortion vector estimate $\gamma_{b,n-1}$ for the image block of the previous image block in the row b. As such, each of the forward probability distribution estimates is calculated recursively from probability distribution estimates from previous image blocks.

For the first image block in each row, the forward probability distortion estimate $\alpha_{b,1}$ is set so that the probability of each of the possible distortion vectors are equally likely.

As illustrated in FIG. 25, each forward probability estimate is passed through a filter, which convolves the forward probability estimate $\alpha_{b,n}$ with a probability distribution with respect to time. The probability distribution is provided so that after the forward probability estimate $\alpha_{b,n}$ has been filtered, the forward probability estimate $\alpha_{b,n}$ is biased or modified in accordance with a likelihood of that value occurring. In one example, the probability distribution is a Gaussian distribution. Effectively, the forward probability distribution is modulated with a two-dimensional Gaussian probability distribution thereby expressing the forward probability distribution of the distortion vectors with respect to a relative likelihood of that distortion vector occurring.

Figure 26:
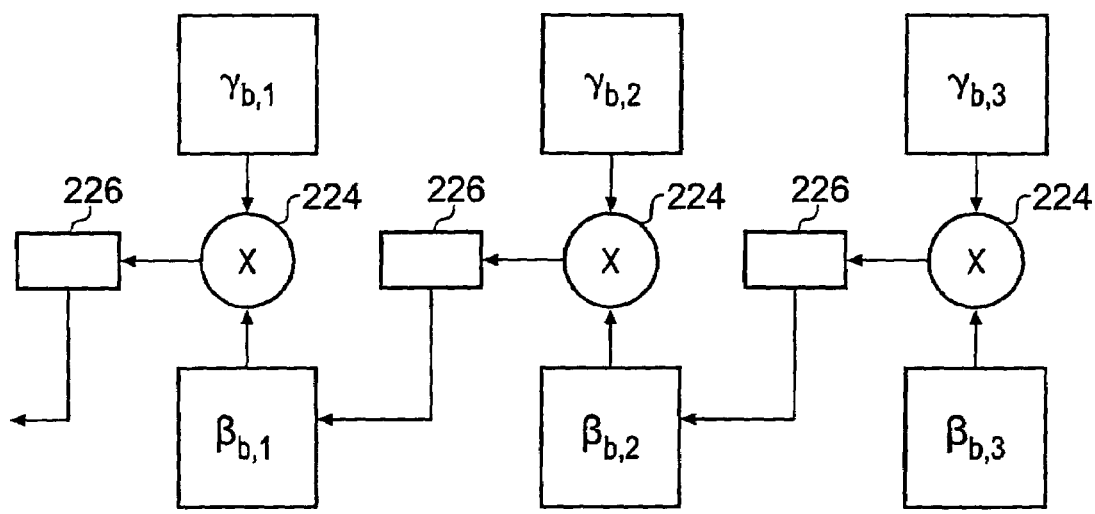
FIG. 26 is a schematic block diagram of a backward probability estimator as shown in FIG. 22.

A corresponding example illustrating the operation of the backward probability estimator 206 is provided in FIG. 26. The backward probability estimator 206 operates in a way which is similar to the operation of the forward probability estimator 204 shown in FIG. 6 except that each backward probability estimate $\beta_{b,n}$ is calculated recursively by a multiplier 224 multiplying the subsequent probability estimate $\beta_{b,n+1}$ for the subsequent block with the observed distortion vector estimate for the subsequent block $\gamma_{b,n+1}$. Thus, the backward probability estimator 206 works in a way, which corresponds to the forward probability estimator 204, except that each backward probability estimate is calculated recursively from subsequent distortion vector probability estimates. As with the forward probability estimator 204, each backward probability estimate is filtered with a probability distribution using a filter 226, which biases the estimate in accordance with a likelihood of that probability estimate occurring. Again, an example of a probability distribution is the Gaussian distribution.

For the last image block in each row, the backward probability distortion estimate $\beta_{b,L}$ is set so that the probability of each of the possible distortion vectors are equally likely.

As explained and illustrated in FIGS. 20 and 21, for each of the forward and backward distortion probability estimates a Gaussian probability distribution is applied by first and second Gaussian filters 208, 210. For each image block, the forward and backward probability distributions provide a two dimensional distribution of possible distortion vectors. An effect of filtering the forward and backward probability estimates is to bias the distortion vector value to a likelihood of that value occurring according to the Gaussian distribution. Effectively, the probability distribution is modulated with the two-dimensional Gaussian probability distribution thereby expressing the probability distribution of the distortion vectors with respect to a relative likelihood of that distortion vector occurring.

The following expressions define mathematically the calculations of the distortion vector estimates, the forward probability distortion estimates and the backward probability distortion estimates, where p( ) is the observed probability of a vector $\phi_n$ for the observed probability $O_n$ for the n-th block for a motion vector b:

| | |
|---|---|
| The probability estimate of a motion vector for block n being in a position b given only that block's correlation surface; | $\gamma_{b,n} \equiv p(\phi_n = b\|O_n)$ |
| The probability estimate of a motion vector for block n being in a position b given that all the correlation surfaces of blocks to the "left" along the row (previous image blocks moving forward in time); | $\alpha_{b,n} \equiv p(\phi_n = b\|O_{m<n})$ |

-continued

| Description | Formula |
|---|---|
| The probability estimate of a motion vector for block n being in position b given all the correlation surfaces of blocks to the "right" along the row (subsequent image blocks moving backward in time) | $\beta_{b,n} \equiv p(\phi_n = b \| O_{m>n})$ |
| The probability estimate of the motion vector for block n being in position b given all the correlation surfaces (final answer) | $\lambda_{b,n} \equiv p(\phi_n = b \| O_{m=1,N}) \propto \alpha\beta\gamma$ |
| The probability of motion vector n being b given that the block to immediate lefts motion vector was definitely in position c (transition probability) | $t_{b,c} \equiv p(\phi_n = b \| \phi_{n-1} = c)$ |

The observed probability distribution of distortion vectors $\gamma_{b,n}$, and the forward and backward probability distortions $\alpha_{b,n}$, $\beta_{b,n}$ are then combined by a combining engine 212 to form for each image block a most likely distortion vector value $\gamma'_{b,n}$ after the image blocks have been processed row-by-row. The combining engine 212 multiplies together the estimated distortion vector $\gamma_{b,n}$, the forward probability distribution $\alpha_{b,n}$, and the backward probability distribution $\beta_{b,n}$ to form a most likely estimate of distortion vectors $\gamma'_{b,n}$.

Various modifications may be made to the embodiments herein for described without departing from the scope of the present invention. For example it will be appreciated that although four possible water mark blocks have been used for the distortion and frame synchronisation detection, any member of blocks can be used to form the predetermined set of blocks to generate this water mark. Furthermore, although the example has been illustrated with respect to a frame comprising only nine regions, it would be appreciated that in practice any number of regions could be used to match the number of bits that are to be encoded with each image frame.

The invention claimed is:

1. A method of detecting a watermark codeword in a received image signal representing a watermarked image, using an image processing apparatus, the watermarked image comprising a plurality of signal samples, each of the plurality of signal samples representing a pixel value of the watermarked image, to which a watermark codeword coefficient value has been added, comprising:

low pass filtering the received image signal at the image processing apparatus to generate, for each of the plurality of signal samples, a local mean value;

subtracting the local mean value from the received image signal at the image processing apparatus to generate a residual signal comprising, for each of the plurality of signal samples, a residual value;

determining, from the residual signal, a local standard deviation for each of the plurality of signal samples at the image processing apparatus;

generating, with the image processing apparatus, for each of the plurality of signal samples, a watermark strength value providing an estimate of a magnitude with which the watermark codeword coefficient value has been added to the respective signal sample;

generating, with the image processing apparatus, for each of the plurality of signal samples, a first gaussian likelihood function describing a likelihood of the watermark codeword coefficient value embedded into the respective signal sample being positive, the first gaussian likelihood function having a mean defined by a sum of the local mean value and the watermark strength value and a standard deviation defined by the local standard deviation;

generating, with the image processing apparatus, for each of the plurality of signal samples, a second gaussian likelihood function describing a likelihood of the watermark codeword coefficient value embedded into the respective signal sample being negative, the second gaussian likelihood function having a mean defined by a difference between the local mean value and the watermark strength value and a standard deviation defined by the local standard deviation;

detecting with the image processing apparatus a watermark in the received image signal based on a probability of respective watermark codeword coefficients added to each of the plurality of signal samples being one of positive or negative, the probability being calculated from the first gaussian likelihood function and the second gaussian likelihood function.

2. The method as claimed in claim 1, wherein the determining the local standard deviation comprises:

squaring the residual signal to generate a squared signal;

low pass filtering the squared signal to generate a filtered squared signal; and square rooting the filtered squared signal to generate a standard deviation signal comprising a local standard deviation value for each of the plurality of signal samples.

3. The method as claimed in claim 1, further comprising:

generating, from the first gaussian likelihood function and the second gaussian likelihood function, a linear approximation as a function of watermark strength describing the probability that the watermark codeword coefficient value embedded in the respective signal sample is positive;

generating a revised estimate of watermark strength; and applying the linear approximation to the revised estimate of watermark strength.

4. The method as claimed in claim 1, wherein the first gaussian likelihood function and the second gaussian likelihood function are generalised gaussian functions having a shape parameter; and the generating the first gaussian likelihood function and the second gaussian likelihood function each comprise:

adapting the shape parameter for each of the plurality of signal samples to provide improved watermark detection performance.

5. A watermark detection apparatus for detecting a codeword in a received image signal representing a watermarked image, the watermarked image comprising a plurality of signal samples, each of the plurality of signal samples representing a pixel value of the watermarked image, to which a watermark codeword coefficient value has been added, the apparatus comprising:

a local mean generator operable to low pass filter the received image signal to generate, for each of the plurality of signal samples, a local mean value;

a residual generator operable to subtract the local mean value from the received image signal to generate a residual signal comprising, for each of the plurality of signal samples, a residual value;

a local standard deviation generator operable to determine from the residual signal, a local standard deviation for each of the plurality of signal samples;

a watermark strength estimator operable to generate for each of the plurality of signal samples, a watermark strength value providing an estimate of a magnitude with which the watermark codeword coefficient value has been added to the respective signal sample;

a likelihood generator operable to generate for each of the plurality of signal samples, a first gaussian likelihood function describing a likelihood of the watermark codeword coefficient value embedded into the respective signal sample being positive, the first gaussian likelihood function having a mean defined by a sum of the local mean value and the watermark strength value and a standard deviation defined by the local standard deviation, and to generate, for each of the plurality of signal samples, a second gaussian likelihood function describing a likelihood of the watermark codeword coefficient value embedded into the respective signal sample being negative, the second gaussian likelihood function having a mean defined by a difference between the local mean value and the watermark strength value and a standard deviation defined by the local standard deviation; and a watermark detector operable to detect a watermark in the received image signal based on a probability of respective watermark codeword coefficients added to each of the plurality of signal samples being one of positive or negative, the probability being calculated from the first gaussian likelihood function and the second gaussian likelihood function.

6. The watermark detector as claimed in claim 5, wherein the local standard deviation generator is operable to square the residual signal to generate a squared signal, low pass filter the squared signal to generate a filtered squared signal, and square root the filtered squared signal to generate a standard deviation signal comprising a local standard deviation value for each of the plurality of signal samples.

7. The watermark detector as claimed in claim 5, wherein the likelihood generator is operable to generate, from the first gaussian likelihood function and the second gaussian likelihood function, a linear approximation as a function of watermark strength describing the probability that the watermark codeword coefficient value embedded in the respective signal sample is positive;

wherein the watermark strength estimator is operable to generate a revised estimate of watermark strength; and wherein the watermark detector is operable to apply the linear approximation to the revised estimate of watermark strength.

8. The watermark detector as claimed in claim 5, wherein the first gaussian likelihood function and the second gaussian likelihood function are generalised gaussian functions having a shape parameter; and wherein the likelihood generator is operable to adapt the shape parameter for each of the plurality of signal samples to provide improved watermark detection performance.

9. A computer-readable medium including computer executable instructions, which when loaded on to a computer cause the computer to perform the method according to claim 1.

* * * * *